(12) United States Patent
Bischof et al.

(10) Patent No.: US 12,435,016 B2
(45) Date of Patent: *Oct. 7, 2025

(54) FLEXIBLE BENZENE PRODUCTION VIA SELECTIVE-HIGHER-OLEFIN OLIGOMERIZATION OF ETHYLENE

(71) Applicant: Chevron Phillips Chemical Company, LP, The Woodlands, TX (US)

(72) Inventors: Steven M. Bischof, Spring, TX (US); Gregory G. Hendrickson, Kingwood, TX (US); Uriah J. Kilgore, Kennewick, WA (US); Bruce E. Kreischer, Kingwood, TX (US); Scott G. Morrison, Kingwood, TX (US); Ryan W. Snell, Jubail Industrial (SA); Orson L. Sydora, Sugar Land, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 173 days.

This patent is subject to a terminal disclaimer.

(21) Appl. No.: 18/225,967

(22) Filed: Jul. 25, 2023

(65) Prior Publication Data
US 2024/0034699 A1 Feb. 1, 2024

Related U.S. Application Data

(60) Provisional application No. 63/369,708, filed on Jul. 28, 2022.

(51) Int. Cl.
*C07C 2/08* (2006.01)
*C07C 2/46* (2006.01)
(Continued)

(52) U.S. Cl.
CPC .............. *C07C 2/46* (2013.01); *C07C 5/327* (2013.01); *C07C 7/09* (2013.01)

(58) Field of Classification Search
CPC .... C07C 2/08; C07C 2/46; C07C 5/03; C07C 5/327; C07C 5/393; C07C 5/41; C07C 5/417; C07C 7/09; C07C 2529/62
See application file for complete search history.

(56) References Cited

U.S. PATENT DOCUMENTS

| 3,274,978 A | 9/1966 | Palchik |
| 3,392,211 A | 7/1968 | Buschmann |
| (Continued) | | |

FOREIGN PATENT DOCUMENTS

| JP | H08301796 A | 11/1996 |
| WO | 2010051415 A1 | 5/2010 |
| (Continued) | | |

OTHER PUBLICATIONS

International Search Report and Written Opinion issued in corresponding PCT Application No. PCT/US2023/028786, mailed on Nov. 30, 2023, 12 pp.
(Continued)

*Primary Examiner* — In Suk C Bullock
*Assistant Examiner* — Jason Y Chong
(74) *Attorney, Agent, or Firm* — Conley Rose, P.C.; Rodney B. Carroll

(57) ABSTRACT

The present disclosure relates to the integration of systems and methods associated with steam cracking, oligomerization reactions, hydrogenation reactions, and aromatization reactions for the production of benzene via the hydrogenation of oligomers produced from ethylene. In some aspects, the disclosed systems and methods utilize one or more of an oligomerization process, a hydrotreating process, and an aromatization process for producing a benzene comprising
(Continued)

effluent. In further aspects, the systems and methods disclosed herein utilize one or more selective oligomerization catalyst systems.

27 Claims, 15 Drawing Sheets

(51) Int. Cl.
| | |
|---|---|
| *C07C 5/03* | (2006.01) |
| *C07C 5/327* | (2006.01) |
| *C07C 5/41* | (2006.01) |
| *C07C 7/09* | (2006.01) |

(56) References Cited

U.S. PATENT DOCUMENTS

| | | | |
|---|---|---|---|
| 3,403,722 A | 10/1968 | Woebcke | |
| 3,407,789 A | 10/1968 | Hallee | |
| 3,407,798 A | 10/1968 | Rock | |
| 3,516,923 A | 6/1970 | Kirk, Jr. | |
| 3,679,762 A | 7/1972 | La Hue | |
| 3,820,965 A | 6/1974 | Woebcke | |
| 4,128,595 A | 12/1978 | Montgomery | |
| 4,151,071 A * | 4/1979 | Myers | B01J 23/26 |
| | | | 585/407 |
| 4,347,392 A | 8/1982 | Cosyns | |
| 4,351,275 A | 9/1982 | Bhojwani | |
| 4,499,055 A | 2/1985 | DiNicolantonio | |
| 4,571,442 A | 2/1986 | Cosyns | |
| 4,762,956 A | 8/1988 | Liu | |
| 4,780,196 A | 10/1988 | Alagy | |
| 5,059,732 A | 10/1991 | Cosyns | |
| 5,151,158 A | 9/1992 | Bowen | |
| 5,401,386 A | 3/1995 | Morrison | |
| 5,427,655 A | 6/1995 | Woebcke | |
| 5,488,024 A | 1/1996 | Cheung | |
| 5,489,565 A | 2/1996 | Cheung | |
| 5,520,550 A | 5/1996 | Okabe | |
| 5,543,375 A | 8/1996 | Lashier | |
| 5,563,312 A | 10/1996 | Knudsen | |
| 5,583,274 A | 12/1996 | Cheung | |
| 5,585,318 A | 12/1996 | Johnson | |
| 5,587,348 A | 12/1996 | Brown | |
| 5,689,028 A | 11/1997 | Lashier | |
| 5,698,752 A | 12/1997 | Brown | |
| 5,750,817 A * | 5/1998 | Tanaka | C07C 11/02 |
| | | | 585/512 |
| 5,877,367 A | 3/1999 | Witte | |
| 6,004,452 A | 12/1999 | Ash | |
| 6,127,310 A | 10/2000 | Brown | |
| 6,190,539 B1 | 2/2001 | Holtermann | |
| 6,790,342 B1 | 9/2004 | Porter | |
| 6,812,180 B2 | 11/2004 | Fukunaga | |
| 7,153,801 B2 | 12/2006 | Wu | |
| 7,157,612 B2 | 1/2007 | Ewert | |
| 7,300,904 B2 | 11/2007 | Dixon | |
| 7,361,623 B2 | 4/2008 | Dixon | |
| 7,554,001 B2 | 6/2009 | Dixon | |
| 7,718,838 B2 | 5/2010 | Woodard | |
| 7,932,425 B2 | 4/2011 | Blessing | |
| 7,994,363 B2 | 8/2011 | Gao | |
| 8,252,956 B2 | 8/2012 | Gao | |
| 8,680,003 B2 | 3/2014 | Sydora | |
| 8,865,610 B2 | 10/2014 | Sydora | |
| 9,199,893 B2 | 12/2015 | Lapinski | |
| 9,284,237 B2 | 3/2016 | Huovie | |
| 10,435,336 B2 | 10/2019 | Kreischer | |
| 2010/0274065 A1 | 10/2010 | Sydora | |
| 2022/0098491 A1 | 3/2022 | Abbott | |

FOREIGN PATENT DOCUMENTS

| | | | |
|---|---|---|---|
| WO | 2015094207 A1 | 6/2015 | |
| WO | 2015095347 A1 | 6/2015 | |

OTHER PUBLICATIONS

Agapie, et. al., "Mechanistic Studies of Olefin and Alkyne Trimerization with Chromium Catalysts: Deuterium Labeling and Studies of Regiochemistry Using a Model Chromacyclopentane Complex." J. Am. Chem. Soc., 2007, 129, 14281-14295.

Agapie, T., "Selective Ethylene Oligomerization: Recent advances in chromium catalysis and mechanistic investigations." Coordination Chemistry Reviews, 2011, vol. 256, pp. 861-880, Elsevier B.V.

Bollmann, et. al., "Ethylene Tetramerization: A New Route to Produce 1-Ociene in Exceptionally High Selectives." J. Am. Chem. Soc., 2004, 126, 14712-14713.

Carter, et. al., "High Activity Ethylene Trimerisation Catalysts Based on Diphosphine Ligands." Chem. Commun., 2002, 858-859.

Chang, J, New projects may raise US ethylene capacity by 52%, PE by 47%, ICIS, Jan. 16, 2014, https://www.icis.com/explore/resources/news/2014/01/16/9744545/new-projects-may-raise-us-ethylene-capacity-by-52-pe-by-47-/.

Hui, H, OUTLOOK '14: Asia methanol demand to strengthen on new uses, ICIS, Dec. 24, 2013. https://www.icis.com/explore/resources/news/2013/12/24/9738408/outlook-14-asia-methanol-demand-to-strengthen-on-news-uses/.

Kearney, Apr. 30, 2014 https://www.kearney.com/industry/chemicals/article/-/insights/shale-gas-threat-or-opportunity-for-the-gcc-article#:~:text=The%20U.S.%20shale%20gas%20revolution.liquid%20cracking%20and%20its%20derivatives.

Nash, Aromatization over Platinum/Zeolite L Catalysts: The Effect of Oxygenates, Thesis submitted in fulfillment for the degree of Doctor of Philosophy, University of Cape Town, Feb. 1997.

Piet W.N.M van Leeuwen, et al., "New Processes for the Selective Production of 1-Octene," Coordination Chemistry Reviews, 255, 2011, pp. 1499-1517.

Sydora, et. al., "Selective Ethylene Trl-/Tetramerization Catalysts." ACS Catal., 2012, 2, 2452.

* cited by examiner

FLEXIBLE BENZENE PRODUCTION VIA SELECTIVE-HIGHER-OLEFIN OLIGOMERIZATION OF ETHYLENE

CROSS-REFERENCE TO RELATED APPLICATIONS

The present application is a non-provisional of and claims priority to U.S. Provisional Patent Application No. 63/369,708 filed Jul. 28, 2022 and entitled "Flexible Benzene Production Via Selective-Higher-Olefin Oligomerization of Ethylene," which application is hereby incorporated by reference in its entirety.

TECHNICAL FIELD

The present disclosure relates to the integration of systems and processes associated with steam cracking, oligomerization reactions, hydrogenation reactions, and aromatization reactions such that benzene can be produced via the hydrogenation of oligomers produced from ethylene.

BACKGROUND

Benzene, also known as benzol, mineral naphtha, phenyl hydride, and annulene, is an aromatic compound of significant commercial importance. Benzene is found in crude oil, is a component of gasoline, and is widely used in the manufacture of plastics, resins, synthetic fibers, rubber lubricants, dyes, detergents, drugs, pesticides, glues, adhesives, cleaning products, paint strippers, and other commercial products. Conventional methods of benzene production that begin with materials contained in crude oil are increasingly expensive due to increasing demand for crude oil. Methods of producing benzene using natural gas as a starting material can provide a lower cost alternative. Thus, additional novel and improved systems and methods for benzene production are desirable.

SUMMARY

Accordingly, the present disclosure provides for novel and non-obvious methods and systems for benzene production, including systems and methods for producing reformate effluent(s) comprising benzene as well as additional, commercially valuable hydrocarbons. For instance, in certain aspects the disclosure provides for a method comprising a) contacting, in an oligomerization process, ethylene with a selective-higher-olefin catalyst to yield an oligomerization reactor effluent comprising 1) $C_6$ hydrocarbons which include 1-hexene and 2) $C_8$ hydrocarbons which include 1-octene; b) recovering 1-hexene and 1-octene from the oligomerization reactor effluent; c) contacting, in a hydrotreating process, 1-hexene, 1-octene, or both 1-hexene and 1-octene recovered from the oligomerization reactor effluent with a hydrogenation catalyst to yield an aromatization feed comprising hexane, octane, or both; and d) contacting, in an aromatization process, the aromatization feed with an aromatization catalyst to yield reformate effluent comprising benzene. In related aspects, the $C_6$ hydrocarbons of the oligomerization reactor effluent comprise about 20 wt. % to about 99 wt. % of the total weight of the oligomerization reactor effluent, while the $C_8$ hydrocarbons comprise about 0.1 wt. % to about 75 wt. % of the total weight of the oligomerization reactor effluent. In related features, the resulting 1-hexene and 1-octene streams are beneficially characterized by significant levels of purity, including 1) a purity level of about 60 wt. % to about 99.9 wt. % for 1-hexene with respect to the total weight of $C_6$ hydrocarbons in the oligomerization reactor effluent, and 2) a purity level of about 95 wt. % to about 99.3 wt. % for 1-octene with respect to the total weight of $C_8$ hydrocarbons in the oligomerization reactor effluent.

In some aspects, an oligomerization reactor effluent produced in accordance with the present disclosure may, in addition to $C_6$ hydrocarbons and $C_8$ hydrocarbons, further comprise one or more of $C_{10}$ hydrocarbons, $C_{12}$ hydrocarbons, and/or $C_{14+}$ hydrocarbons, including combinations of the foregoing. For example, the oligomerization reactor effluent may be characterized by one or more of 1) a $C_{10}$ hydrocarbon stream comprising about 1 percent by weight (wt. %) to about 4 wt. %; 2) a $C_{12}$ hydrocarbon stream comprising about 0.1 wt. % to about 3 wt. %; and/or 3) a $C_{14+}$ hydrocarbon stream comprising about 0 wt. % to about 3.5 wt. %, all of which are based on the total weight of the oligomerization reactor effluent.

Additional features of the disclosed method are directed to the use of catalysts and/or catalyst systems capable of producing an oligomerization reactor effluent characterized by the components and component concentrations described herein. For example, a catalyst for use in the disclosed method may comprise a selective oligomerization catalyst such as PN Mes-tBuPh-DIP, PN Mes-MeOPh-DIP, PN Xyl-Bz-DnB, PN Xyl-Bz-DPh, PN Guan-DIP, PN Mes-Ph-DIP, PN Xyl-Ph-DEt, PNP DPh-Hex-DPh, PNP DPh-Cy-DPh, PNP DPh-iPR-DPh2-OMe, and PNP DPh-1MeiPR-DPh, as well as combinations of one or more of selective oligomerization catalysts such as those described above. In further aspects, the aromatization catalyst described above may comprise one or more of a zeolite support, a Group VIII transition metal in accordance with the Periodic Table of Elements, and one or more halides. The disclosed method may, in aspects, further comprise the step of contacting ethylene with a selective oligomerization catalyst in the presence of a diluent such as isobutane, cyclohexane, methylcyclohexane, isobutene, and/or 1-hexene, including combinations thereof. Additionally, the step of contacting ethylene and a selective oligomerization catalyst may be performed in the presence of a diluent, including but not limited to a diluent recovered from the reformate effluent, where the diluent is selected from one or more of a raffinate, benzene, toluene, xylene, and one or more branched alkanes, as well as combinations thereof. In alternative aspects, the method may further comprise 1) flowing a raffinate recovered from the aromatization process to a steam cracker; and 2) cracking the raffinate in the steam cracker. The ethylene stream for use in the disclosed method may be pure or essentially pure ethylene or, alternatively, the stream may comprise ethylene and one or more additional hydrocarbons. For example, in some aspects, the ethylene that is contacted in the oligomerization process is received in a stream comprising ethylene and ethane. Additionally, the method may benefit from the use of one or more removal, purification, and/or separation systems. For instance, a sulfur removal system may or may not be used at one or more steps or processes characterizing the methodology. In some aspects, for example, the use of a sulfur removal system is advantageously avoided between the oligomerization process and the aromatization process.

Further features of the methodology may encompass the recovery of one or more hydrocarbons of interest from the oligomerization reactor effluent, including but not limited to 1-hexene and 1-octene, via fractionation of the oligomerization reactor effluent into 1) a first stream comprising heavy hydrocarbons and spent catalyst; 2) a second stream comprising octenes; and 3) a third stream comprising hexenes. In related features, only a portion of the third stream (with regards to the first stream, the second stream, and the third stream as described above) is utilized as a feedstock for the hydrotreating process. Alternatively, the recovery of 1-hexene and 1-octene from the oligomerization reactor effluent may comprise fractionating the oligomerization reactor effluent into 1) a first stream comprising heavy hydrocarbons and spent catalyst; 2) a second stream comprising octenes; and 3) a third stream comprising hexenes, wherein, with regards to the first stream, the second stream, and the third stream, only a portion of the second stream and only a portion of the third stream are fed to the hydrotreating process.

In further aspects, recovering 1-hexene and 1-octene from the oligomerization reactor effluent described herein comprises fractionating the oligomerization reactor effluent into 1) a first stream comprising heavy hydrocarbons and spent catalyst; and 2) a second stream comprising hexenes and octenes, wherein, of the first stream and the second stream, only a portion of the second stream is fed to the hydrotreating process. In still further aspects, the recovery of 1-hexene and 1-octene from the oligomerization reactor effluent as described herein comprises fractionating the oligomerization reactor effluent into 1) a first stream comprising spent catalyst; and 2) a second stream comprising hexenes, octenes, and heavy hydrocarbons, and further feeding only a portion of the second stream into the hydrotreating process. Additional features associated with the methodology described herein further comprise the recovery of 1-hexene and 1-octene from the oligomerization reactor effluent comprising separating the oligomerization reactor effluent into 1) a first stream comprising heavy hydrocarbons and spent catalyst; 2) a second stream comprising octenes; and 3) a third stream comprising hexenes; fractionating the third stream to yield a high purity 1-hexene stream and a $C_6$ feed stream; and flowing the $C_6$ feed stream to the hydrotreating process. In certain aspects, the method may further comprise fractionating a refinery stream to recover a naphtha stream; feeding the naphtha stream to the hydrotreating process; and contacting, in the hydrotreating process, naphtha with the hydrogenation catalyst to yield one or more of n-hexane and n-octane in the aromatization feed.

In aspects, a reformate effluent produced in accordance with the instant disclosure may, in addition to benzene, further comprise one or more commercially valuable hydrocarbons that may be isolated and/or directed for further processing. For instance, the reformate effluent may further comprise one or more of toluene, ethylbenzene, xylene, 1-hexene, and 1-octene, including combinations thereof. In accordance with certain features, the reformate effluent may be further fractionated or separated into individual streams corresponding to one or more of the hydrocarbons described herein, such as a benzene stream, a toluene stream, a xylene stream, and/or a raffinate stream. Accordingly, the resulting hydrocarbon streams may be characterized by the presence of one or more additional hydrocarbons. For example, 1-hexene may be present in a benzene stream and/or a toluene stream produced in accordance with the disclosed methodology, while 1-octene may be present in a xylene stream and/or a raffinate stream.

In accordance with additional features of the disclosed methodology, the aromatization process may be further configured to beneficially produce a hydrogen effluent, which may be achieved by 1) flowing a portion of the benzene stream and a portion of the hydrogen effluent to a hydrogenation process to yield cyclohexane; and 2) recycling the cyclohexane to the oligomerization process.

As noted herein, the oligomerization reactor effluent may be characterized by the presence of various hydrocarbons. In certain aspects, the oligomerization reactor effluent may comprise, inter alia, hexane species such as cyclohexane, which may be recovered or isolated from the oligomerization reactor effluent as cyclohexane and/or other (non-cyclohexane) hexanes. In additional aspects, the non-cyclohexane species may be recovered from the oligomerization reactor effluent as processed or fluidly conveyed to the hydrotreating process described herein, while any residual cyclohexane may be recovered from the oligomerization reactor effluent and recycled or conveyed to the oligomerization process.

Additional features, processes, and manipulations may be incorporated into the methods described herein, e.g., for enhancing the value and/or utility of the same. For instance, in non-limiting aspects the method may further comprise 1) cracking one or more of ethane, propane, butane, pentane, and/or naphtha, including mixtures thereof, in a steam cracker to yield a cracker derived effluent comprising ethylene; and 2) flowing or otherwise conveying the resulting ethylene that is recovered or isolated from the cracker effluent to the oligomerization process described herein. The resulting cracker effluent may, in aspects, further comprise one or more light hydrocarbons, wherein the method may advantageously further comprise 1) using the light hydrocarbons recovered from the cracker effluent as a cooling source for an oligomerization reactor in the oligomerization process, including for use in a first fractionation process located downstream of the oligomerization process, in a second fractionation process located downstream of the aromatization process, or in combination with the first fractionation process and the second fractionation process. In related aspects, the thermal energy associated with the methodology of the instant disclosure may be beneficially recycled and/or recovered for use in one or more steps or processes associated therewith. For example, the method may further comprise 1) recovering steam from the steam cracker; and 2) utilizing the recovered steam as a heating source for the oligomerization process described in the foregoing, for use in a first fractionation process located downstream of the oligomerization process, in a second fractionation process located downstream of the aromatization process, or for use in a combination of the first and second fractionation processes as further described herein.

As noted herein, an oligomerization reactor effluent produced in accordance with the present disclosure may comprise numerous hydrocarbon species and derivatives thereof. In accordance with certain features, the oligomerization reactor effluent may comprise or additionally comprise one or more $C_{9+}$ hydrocarbons. Accordingly, the method may further comprise steps or processes for utilizing the same, including but not limited to 1) blending the C9+ hydrocarbons into a fuel stream such as a motor fuel stream. In additional aspects, the C9+ hydrocarbon stream may be initially blended with additional hydrocarbon streams such as a raffinate stream isolated from the reformate effluent, with the resulting $C_{9+}$ hydrocarbon/raffinate stream subsequently blended into a fuel stream, e.g., a motor fuel stream.

The disclosed method may, in certain aspects, further comprising the recycling, re-introduction or utility of chemical species or moieties produced therein, including 1) flowing or recycling hydrogen obtained from the reformate effluent to the oligomerization process, to the hydrotreating process, or both (i.e., the oligomerization process and the hydrotreating process).

The present disclosure further provides for systems configured to perform and capable of performing, for instance, the methods disclosed herein. In accordance with certain features, a system is provided comprising 1) an oligomerization reactor configured to contact ethylene with a selective oligomerization catalyst to yield an oligomerization reactor effluent comprising $C_6$ hydrocarbons which include 1-hexene and $C_8$ hydrocarbons which include 1-octene; 2) a first separation unit configured to recover 1-hexene and 1-octene from the oligomerization reactor effluent; 3) a hydrogenation reactor configured to contact 1-hexene, 1-octene, or both 1-hexene and 1-octene recovered from the oligomerization reactor effluent with a hydrogenation catalyst to yield an aromatization feed comprising one or more of hexane(s), octane(s), and alkylcyclopentane(s); and 4) an aromatization reactor configured to contact the aromatization feed with an aromatization catalyst to yield a reformate effluent comprising benzene, wherein the aromatization catalyst comprises a zeolite support, a Group VIII metal, and one or more halides. In additional aspects, the system may further comprise a steam cracker that has been configured to produce a cracker effluent comprising ethylene, and the resulting ethylene may be recovered from the cracker effluent for use in performing oligomerization in the oligomerization reactor. The cracker effluent may, in accordance with further features, comprise one or more light hydrocarbons, such that one or more of the oligomerization reactor, the first separation unit, a second separation unit configured to receive and separate the reformate effluent, or a combination of two or more of these components may be configured to advantageously use the light hydrocarbons as a cooling source.

The steam cracker may be configured for best performing the disclosed method, including aspects where the steam cracker is configured to produce a steam effluent, and where the oligomerization reactor, the first separation unit, a second separation unit configured to receive and separate the reformate effluent, or a combination thereof is configured to beneficially utilize the steam effluent as an internally derived heat source.

The disclosed system may further comprise, inter alia, a fractionator configured to fractionate a refinery stream to recover a naphtha stream, such that naphtha is capable of effectively contacting the hydrogenation catalyst for producing one or more of n-hexane and n-octane in the aromatization feed.

In additional aspects, the reformate effluent produced by the disclosed system may further comprise toluene, ethylbenzene, xylene, 1-hexene, and 1-octene, including combinations thereof, and the system may further comprise a second separation unit for optimally processing the reformate effluent, such as a second separation unit configured to fractionate the reformate effluent into a benzene stream, a toluene stream, a xylene stream comprising ethylbenzene and xylene, and a raffinate stream. In related aspects, 1-hexene may be present in the benzene stream and/or the toluene stream, while 1-octene may be present in the xylene stream, the raffinate stream, or both.

The disclosed system may be additionally arranged or customized, in accordance with certain features, such that the aromatization reactor is configured to yield a hydrogen effluent, the hydrogenation reactor is configured to receive a portion of the benzene stream and a portion of the hydrogen effluent for the subsequent production of cyclohexane, and the oligomerization reactor is configured to receive the cyclohexane produced by the hydrogenation reactor. In alternative aspects, the system may further comprise a second separation unit that has been optimized or configured to fractionate the oligomerization reactor effluent for producing a first stream comprising heavy hydrocarbons and spent catalyst, a second stream comprising octenes, and a third stream comprising hexenes, where only a portion of the third stream (comprising hexenes) is fed to the aromatization reactor.

In accordance with further features, the system may additionally comprise a second separation unit configured to fractionate the oligomerization reactor effluent into a first stream comprising heavy hydrocarbons and spent catalyst, a second stream comprising octenes, and a third stream comprising hexenes, where only a portion of the second stream (comprising octenes) is fed to the aromatization reactor. In certain features, the system may further comprise a second separation unit configured to fractionate the oligomerization reactor effluent into a first stream comprising heavy hydrocarbons and spent catalyst, a second stream comprising octenes, and a third stream comprising hexenes, where only a portion of the second stream (comprising octenes) and at least a portion of the third stream (comprising hexenes) are fed to the aromatization reactor. In aspects, the system further comprises a second separation unit configured to fractionate the oligomerization reactor effluent into a first stream comprising heavy hydrocarbons and spent catalyst and a second stream comprising hexenes and octenes, where only a portion of the second stream (comprising hexenes and octenes) is fed to the aromatization reactor. In additional aspects, the system further comprises a second separation unit configured to fractionate the oligomerization reactor effluent into a first stream comprising spent catalyst and a second stream comprising hexenes, octenes, and heavy hydrocarbons, wherein only a portion of the second stream (comprising hexenes, octenes, and heavy hydrocarbons) is fed to the aromatization reactor.

In accordance with some features of the disclosed system, the first separation unit of the system is configured to recover a first stream comprising heavy hydrocarbons and spent catalyst, a second stream comprising octenes, and a third stream comprising hexenes and hexanes, where the system further comprises 1) a $C_6$ separator configured to split the third stream into a) a high purity 1-hexene stream; and b) a hexanes stream; and 2) a cyclohexane recovery column configured for separating the hexanes stream into a residual $C_6$ feed and a cyclohexane recycle stream, where 1) the residual $C_6$ feed is fed to the aromatization reactor, and 2) the cyclohexane recycle stream is fed to the oligomerization reactor. In further aspects, the selective oligomerization catalyst is selected from PN Mes-tBuPh-DIP, PN Mes-MeOPh-DIP, PN Xyl-Bz-DnB, PN Xyl-Bz-DPh, PN Guan-DIP, PN Mes-Ph-DIP, PN Xyl-Ph-DEt, PNP DPh-Hex-DPh, PNP DPh-Cy-DPh, PNP DPh-iPR-DPh2-OMe, PNP DPh-1MeiPR-DPh, or a combination thereof, and the aromatization catalyst comprises a zeolite support, a Group VIII metal, and one or more halides, as further described herein.

DETAILED DESCRIPTION

Figure 1:
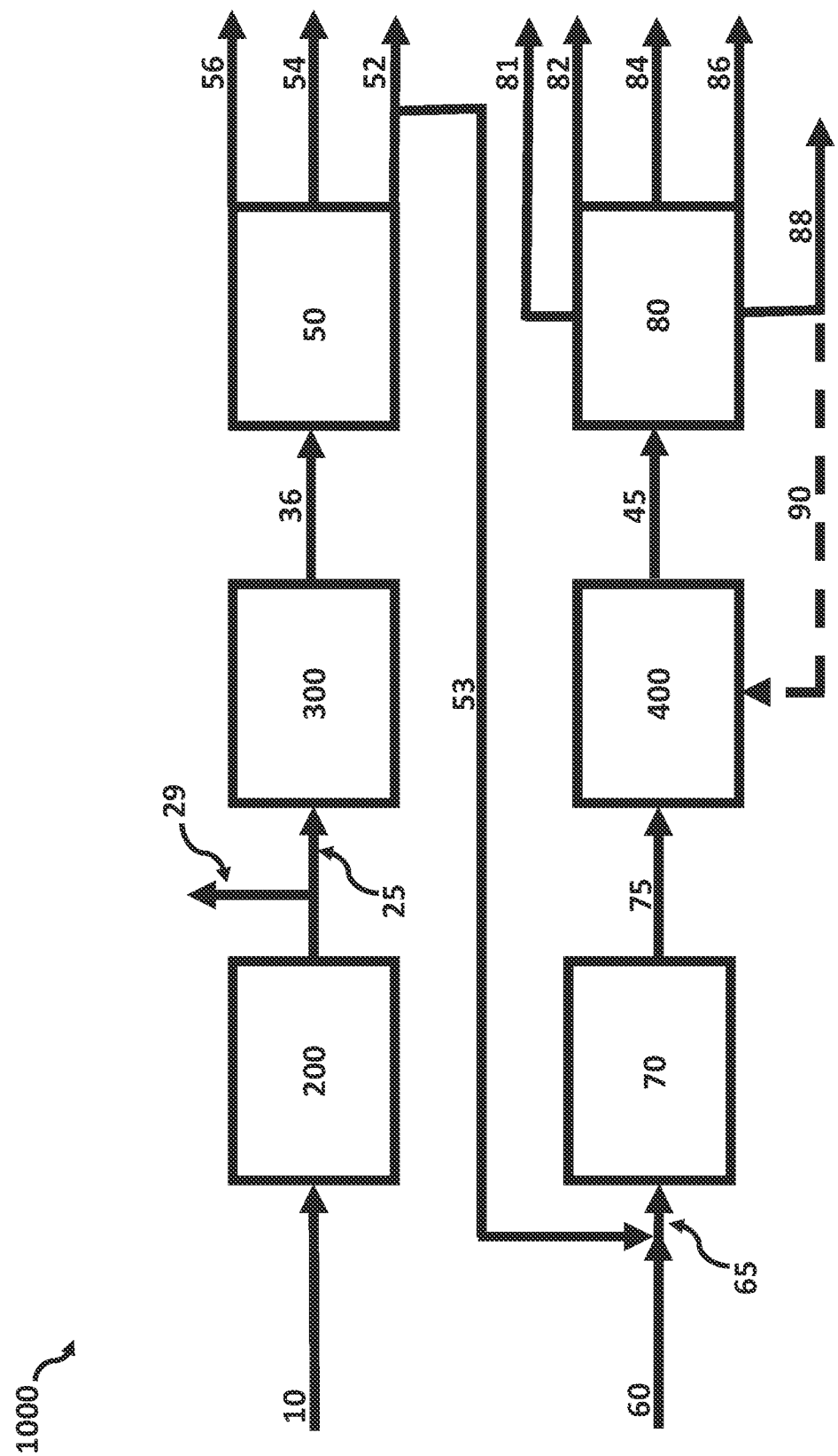
FIG. 1 illustrates a schematic of an integrated converting system.

It should be understood at the outset that although an illustrative implementation of one or more aspects are provided below, the disclosed systems, processes, and/or methods can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

Disclosed herein are systems, processes, apparatuses and methods for multi-step chemical converting wherein several chemical transformations, which are each conventionally performed in a discrete process, are integrated into a single, continuous-flow system. The integrated converting systems as well as the processes, apparatuses, and methods associated therewith, are generally related to continuous-flow systems which integrate converting $C_{4-}$ hydrocarbons, such as hydrocarbons derived from natural gas (e.g., ethane), into oligomer intermediates (e.g., 1-hexene and/or 1-octene), which are further converted into arenes (e.g., benzene).

As disclosed herein, a method of utilizing an integrated converting system generally comprises one or more of (a) cracking a hydrocarbon feedstock in a cracking process to yield a cracker effluent comprising a monomer; (b) flowing the monomer recovered from the cracker effluent to an oligomerization process; (c) contacting, in the oligomerization process, the monomer and an oligomerization catalyst to yield an oligomerization reactor effluent comprising an oligomer product; (d) flowing the oligomer product recovered from the oligomerization reactor effluent to a hydrotreating process; (e) contacting, in the hydrotreating process, the oligomer product with a hydrogenation catalyst to yield an aromatization feed comprising hexane, octane, or both; (f) flowing the aromatization feed to an aromatization process; and (g) contacting, in the aromatization process, the aromatization feed with an aromatization catalyst to yield a reformate effluent comprising an arene. In an aspect, the integrated converting systems of the present disclosure are continuous, serial-flow systems, e.g., the cracking process is connected to the oligomerization process, the oligomerization process is connected to the hydrotreating process, and the hydrotreating process is connected to the aromatization process.

Throughout the systems, processes, and methods disclosed herein numerous streams and products (e.g., ethylene, 1-hexene, 1-octene, benzene), are recovered from reactors and/or process streams. One having ordinary skill in the art will recognize that a stream or product may be recovered directly from a reactor or process in which it is formed; alternatively, the stream or product may be recovered from another process and/or stream located downstream of where it was formed.

The following definitions are provided in order to aid those skilled in the art in understanding the detailed description of the present disclosure. Unless otherwise defined herein, scientific and technical terms used in connection with the present disclosure shall have the meanings that are commonly understood by those of ordinary skill in the art to which this disclosure belongs. Further, unless otherwise required by context, singular terms shall include pluralities and plural terms shall include the singular.

Further, certain features of the present disclosure which are, for clarity, described herein in the context of separate aspects, may also be provided in combination in a single aspect. Conversely, various features of the disclosure that are, for brevity, described in the context of a single aspect, may also be provided separately or in any sub-combination.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ ed. (1997), can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

Groups of elements of the periodic table are indicated using the numbering scheme indicated in the version of the periodic table of elements published in, for instance, *Chemical and Engineering News*, 63(5), 27, 1985. In some instances, a group of elements may be indicated using a common name assigned to the group; for example, alkali earth metals (or alkali metals) for Group 1 elements, alkaline earth metals (or alkaline metals) for Group 2 elements, transition metals for Group 3-12 elements, and halogens for Group 17 elements.

General formulas $C_{A+}$ and $C_{A-}$ represent the number of carbon atoms in the molecular formula of an organic molecule (e.g., a hydrocarbon), where A is an integer or whole number. For example, $C_{3+}$ represents compounds with three or more carbon atoms per molecule and $C_{5-}$ represents compounds with five or less carbon atoms per molecule.

Unless explicitly stated otherwise in defined circumstances, all percentages, parts, ratios, and like amounts used herein are defined by weight.

The term "olefin," whenever used in this specification and claims refers to compounds that have at least one carbon-carbon double bond that is not part of an aromatic ring or ring system. The term "olefin" includes aliphatic and aromatic, cyclic and cyclic, and/or linear and branched compounds having at least one carbon-carbon double bond that is not part of an aromatic ring or ring system unless specifically stated otherwise. The term "olefin," by itself, does not indicate the presence or absence of heteroatoms and/or the presence or absence of other carbon-carbon double bonds unless explicitly indicated. Olefins having only one, only two, only three, etc., carbon-carbon double bonds can be identified by use of the term "mono-," "di-," "tri-," etc., within the name of the olefin. The olefins can be further identified by the position of the carbon-carbon double bond(s).

The term "reactor effluent," and its derivatives (e.g., oligomerization reactor effluent), generally refers to all the material which exits the reactor. The term "reactor effluent," and its derivatives, can also be prefaced with other descriptors that limit the portion of the reactor effluent being referenced. For example, while the term "reactor effluent" would refer to all material exiting the reactor (e.g., product and solvent or diluent, among others), the term "olefin reactor effluent" refers to the effluent of the reactor which contains an olefin (i.e., carbon-carbon) double bond.

The term "oligomerization," and its derivatives, refers to processes which produce a mixture of products containing at least 70 weight percent (70 wt. %) of products containing from 2 to 30 monomer units. Similarly, an "oligomer" is a product that contains from 2 to 30 monomer units while an "oligomerization product" includes all product made by the "oligomerization" process including the "oligomers" and products which are not "oligomers" (e.g., product which contain more than 30 monomer units). It should be noted that the monomer units in the "oligomer" or "oligomerization product" do not have to be the same. For example, an "oligomer" or "oligomerization product" of an "oligomerization" process using ethylene and propylene as monomers can contain both ethylene and/or propylene units.

The term "trimerization," as well as derivatives thereof, refers to a process which produces a mixture of products containing at least 70 weight percent products containing three and only three monomer units. A "trimer" is a product which contains three and only three monomer units while a "trimerization product" includes all products made by the trimerization process including trimer and products which are not trimers (e.g., dimers and/or tetramers). Generally, an olefin trimerization reduces number of olefinic bonds, i.e., carbon-carbon double bonds, by two when considering the number of olefin bonds in the monomer units and the number of olefin bonds in the trimer. It should be noted that the monomer units in the "trimer" or "trimerization product" do not have be the same. For example, a "trimer" of a "trimerization" process using ethylene and butene as monomers can contain ethylene and/or butene monomer units, i.e., the "trimer" may include $C_6$, $C_8$, $C_{10}$, and $C_{12}$ products. In another example, a "trimer" of a "trimerization" process using ethylene as the monomer can contain ethylene monomer units. It should also be noted that a single molecule can contain two monomer units. For example, dienes such as 1,3-butadiene and 1,4-pentadiene have two monomer units within one molecule.

The term "tetramerization," and derivatives thereof, refer to a process which produces a mixture of products containing at least 70 weight percent products containing four and only four monomer units. A "tetramer" is a product which contains four and only four monomer units while a "tetramerization product" includes all products made by the tetramerization process including tetramer and product which are not tetramer (e.g., dimers or trimer). Generally, an olefin tetramerization reduces number of olefinic bonds, i.e., carbon-carbon double bonds, by three when considering the number of olefin bonds in the monomer units and the number of olefin bonds in the tetramer. It should be noted that the monomer units in the "tetramer" or "tetramerization product" do not have be the same. For example, a "tetramer" of a "tetramerization" process using ethylene and butene as monomers can contain ethylene and/or butene monomer units. In an example, a "tetramer" of a "tetramerization" process using ethylene as the monomer can contain ethylene monomer units. It should also be noted that a single molecule can contain two monomer units. For example, dienes such as 1,3-butadiene and 1,4-pentadiene have two monomer units within one molecule.

The term "monomer" refers to a $C_4$ hydrocarbon having a molecular structure containing a single carbon-carbon double bond. For example, the monomer may be a $C_2$ monoolefin.

The term "oligomer" refers to a $C_{6+}$ hydrocarbon having a molecular structure containing at least one carbon-carbon double bond. For example, the oligomer may be a $C_6$ monoolefin.

The term "arene" refers to monocyclic $C_6$ to $C_{14}$ aromatic compounds.

The term "cetane number" is a measure of the ignition properties of diesel fuel relative to cetane ($C_{16}H_{34}$), as a standard.

The term "smoke point" as used for an oil or fat is the temperature at which, under specific and defined conditions, the oil or fat begins to produce a continuous bluish smoke that becomes clearly visible.

A further understanding of the aspects of the present disclosure can be found by referring to the attached schematic flow diagrams, in combination with the following descriptions. Various additional pumps, valves, heaters, coolers and other conventional equipment necessary for the practice of the present disclosure herein will be familiar to one skilled in the art. Said additional equipment has been omitted from the drawings for the sake of clarity. The descriptions of the drawings provide one method for operating the process. However, it is understood that while these drawings are general representations of the process, minor changes can be made in adapting the drawings to the various conditions within the scope of the disclosure. It is also understood that numerical references in the drawings are consistent throughout the drawings. For example, an inlet stream 10, comprising a hydrocarbon feedstock, is a hydrocarbon feedstock inlet stream in all drawings. Unless otherwise explicitly disclosed, the functions and components of a process in one integrated converting system are substantially the same within another integrated converting system comprising that process. In other words, the functions and components of cracking process 200 within integrated converting system 1000 are substantially the same as the functions and components of cracking process 200 within integrated converting system 1100, or the functions and components of cracking process 200 within integrated converting system 1200, etc., unless otherwise explicitly disclosed.

With reference to FIG. 1, an integrated converting system 1000 is described. Integrated converting system 1000 generally comprises cracking process 200, oligomerization process 300, aromatization process 400, first fractionation process 50, hydrotreating process 70, and second fractionation process 80.

In the integrated converting systems disclosed herein, various system components can be in fluid communication via one or more conduits (e.g., pipes, tubing, flow lines, etc.) suitable for the conveyance of a particular stream, for example as shown in detail by the numbered streams in FIG. 1.

A hydrocarbon feedstock 10 flows into cracking process 200 wherein hydrocarbons are converted (i.e., cracked), into monomers. In an aspect, the monomer comprises ethylene. Cracking process 200 may comprise any cracking process suitable for producing ethylene as disclosed herein. Methods of converting hydrocarbons into ethylene are disclosed in U.S. Pat. No. 6,790,342, which is incorporated herein by reference in its entirety. Any method of producing ethylene disclosed in U.S. Pat. No. 6,790,342 may be utilized herein. The hydrocarbon feedstock 10 comprises any one or more hydrocarbons suitable for use as disclosed herein. For example, the hydrocarbons may comprise non-aromatic hydrocarbons, aromatic hydrocarbons, and a combination thereof. The hydrocarbons may be derived from natural gas, gas condensates, gas oils, or combinations thereof. In an aspect, the hydrocarbons comprise ethane, propane, butanes, pentanes, naphthas, or combinations thereof. In a further aspect, the hydrocarbon feedstock 10 comprises ethane wherein the ethane may be derived from a source of natural gas.

In a particular aspect, an amount of ethane in the hydrocarbon feedstock 10 is in a range of from about 10 wt. % to about 95 wt. %; alternatively, about 20 wt. % to about 80 wt. %, or alternatively, about 40 wt. % to about 60 wt. %, based upon a total weight of the hydrocarbon feedstock 10.

Figure 2:
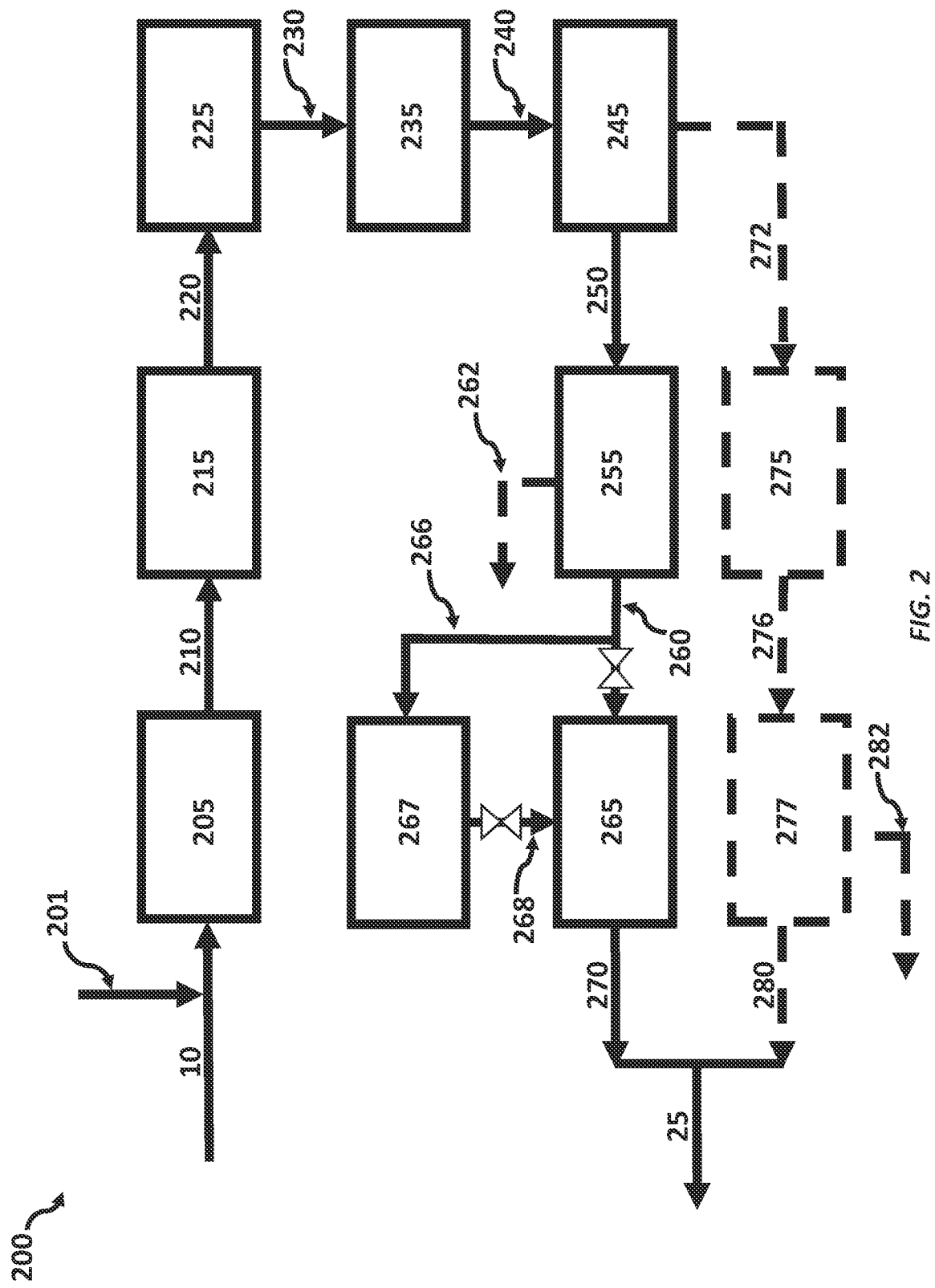
FIG. 2 illustrates a schematic of a cracking process.

Referring to FIG. 2, an aspect of cracking process 200 is described. The hydrocarbon feedstock 10 is combined with a hydrocarbon recycle stream 201. The hydrocarbon recycle stream 201 may be combined with other streams of an integrated reforming system disclosed herein. For example, the hydrocarbon recycle stream 201 may be combined (not shown), with a $C_{3+}$ stream 262 and/or an alternate $C_{3+}$ stream 282 of cracking process 200; or alternatively, with a heavies recycle 180 of FIGS. 12 and 13; alternatively, as further described herein. It is contemplated that some aspects of cracking process 200 may operate without the hydrocarbon recycle 201.

The hydrocarbon feedstock 10 flows into cracking zone 205 comprising a steam cracker wherein contact with elevated temperature produces a cracker effluent 210. Cracking zone 205 comprises one or more radiant furnace reactors capable of producing the cracker effluent 210. In an aspect, cracking zone 205 may have a temperature in a range of from about 600° C. to about 1500° C.; alternatively, about 750° C. to about 900° C. In a further aspect, cracking zone 205 may have an inlet pressure in a range of from about 5 psig to about 400 psig (about 0.03 MPag to about 2.76 MPag); or alternatively, about 29 psig to about 45 psig (about 0.19 MPag to about 0.31 MPag); and an outlet pressure in a range of from about 0.5 psig to about 40 psig (about 0.0034 MPag to about 0.28 MPag); or alternatively, about 3.5 psig to about 11 psig (about 0.024 MPag to about 0.076 MPag). Radiant furnace reactors are disclosed in U.S. Pat. Nos. 5,151,158; 4,780,196; 4,499,055; 3,274,978; 3,407,789; and 3,820,955; each of which is incorporated herein by reference in its entirety. In an aspect, the cracker effluent 210 comprises one or more monomers, hydrogen, methane, acetylene, ethane, $C_{3+}$ saturated hydrocarbons, and combinations thereof. In a further aspect, the monomer(s) comprises ethylene, propylene, butene, or combinations thereof, or alternatively, ethylene.

An amount of ethylene in the cracker effluent 210 may be in a range of from about 10 wt. % to about 95 wt. %; alternatively, about 20 wt. % to about 80 wt. %; or alternatively, about 40 wt. % to about 70 wt. %, based upon a total weight of the cracker effluent 210. In a further aspect, the cracker effluent 210 may comprise from about 1 wt. % to about 20 wt. % hydrogen, from about 1 wt. % to about 30 wt. % methane, from about 1 wt. % to about 30 wt. % acetylene, from about 3 wt. % to about 45 wt. % ethane, and from about 0 wt. % to about 25 wt. % $C_{3+}$ hydrocarbons.

The cracker effluent 210 flows into quenching zone 215 to produce a quenched gas stream 220. In an aspect, an operating temperature of quenching zone 215 may be less than necessary to sustain a cracking reaction occurring within the cracker effluent 210. In an aspect, the cracker effluent 210 is cooled to a temperature below about 595° C.; alternatively, to a temperature in a range of about 30° C. to about 110° C. to form the quenched gas stream 220. Quenching can be effected by any means suitable to one having ordinary skill in the art. For example, the cracker effluent 210 may be passed to a quench boiler and quench tower where fuel oil and a dilution stream can be removed. Methods for cooling the cracker effluent 210 are disclosed in U.S. Pat. Nos. 3,407,798; 5,427,655; 3,392,211; 4,351,275; and 3,403,722, all herein incorporated by reference in their entirety. The quenched gas stream 220 flows into first compression zone 225 to produce a pressurized gas stream 230. In an aspect, the pressurized gas stream 230 may comprise a pressure in a range of from about 150 psig to about 650 psig (about 1.034 MPag to about 4.48 MPag). First compression zone 225 comprises one or more gas compressors wherein the gas compressors may be any gas compressor suitable for use as disclosed herein.

The pressurized gas stream 230 flows into de-acidifying zone 235, wherein hydrogen sulfide ($H_2S$) and carbon dioxide ($CO_2$) are removed to produce a wet gas stream 240. In an aspect, de-acidifying zone 235 removes a portion of the $H_2S$ and $CO_2$ within the pressurized gas stream 230. In a further aspect, the wet gas stream 240 may have a $H_2S$ concentration of less than about 0.1 ppm by weight; alternatively, in a range of about 25 ppb to about 100 ppb by weight. In yet a further aspect, the wet gas stream 240 may have a $CO_2$ concentration of less than about 5 ppm by weight. Removal of $H_2S$ and $CO_2$ may be effected by any suitable means as determined by one having ordinary skill in the art and with the aid of this disclosure. In yet a further aspect, diethanolamine or caustic contactors may be used to remove at least a portion of the $H_2S$ and $CO_2$ comprising the pressurized gas stream 230. The wet gas stream 240 flows into drying zone 245 to produce a cracked gas stream 250. In an aspect, the water content of the cracked gas stream 250 is less than an amount needed to effect downstream operational problems. In a further aspect, the water content of the cracked gas stream 250 is less than about 10 ppm by weight. Drying in drying zone 245 may be effected by any suitable means as determined by one having ordinary skill in the art and with the aid of this disclosure. In an aspect, molecular sieve beds can be utilized to remove water from the wet gas stream 240.

The cracked gas stream 250 flows into de-ethanizer zone 255 to produce a $C_{2-}$ stream 260 and a $C_{3+}$ stream 262. De-ethanizer zone 255 comprises a fractionator capable of producing the $C_{2-}$ stream 260 and the $C_{3+}$ stream 262. The $C_{2-}$ stream 260 may comprise hydrogen, methane, ethane, acetylene, ethylene or combinations thereof. The $C_{3+}$ stream 262 comprises $C_3$ hydrocarbons and heavier constituents and, in an aspect, may be combined with the hydrocarbon recycle stream 201 (not shown). The $C_{2-}$ stream 260 flows into hydrogenation zone 265 wherein a portion of the acetylene within the $C_{2-}$ stream 260 may be removed. An ethylene stream 270 is recovered from hydrogenation zone 265. Hydrogenation of the $C_{2-}$ stream 260 may be performed by any means suitable as determined by one having ordinary skill in the art and with the aid of this disclosure. For example, an acetylene reactor containing a catalyst can be utilized to hydrogenate a portion of the acetylene within the $C_{2-}$ stream 260. Typically, Group VIII metal hydrogenation catalysts are utilized. Hydrogenation catalysts are disclosed in U.S. Pat. Nos. 3,679,762; 4,571,442; 4,347,392; 4,128,595; 5,059,732; 5,488,024; 5,489,565; 5,520,550; 5,583,274; 5,698,752; 5,585,318; 5,587,348; 6,127,310 and 4,762,956, each of which is incorporated herein by reference in its entirety. Operating conditions in hydrogenation zone 265 may encompass any combination of suitable conditions as determined by one having ordinary skill in the art and with the aid of this disclosure. In an aspect, the temperature and pressure in hydrogenation zone 265 may be at levels capable to hydrogenate a portion of the acetylene in the $C_{2-}$ stream 260. In a further aspect, hydrogenation zone 265 may have a temperature in a range of from about 10° C. to about 205° C. In further aspects, hydrogenation zone 265 may have a pressure in a range of about from 360 psig to about 615 psig (about 2.48 MPag to about 4.24 MPag). In some aspects, an amount of acetylene remaining in ethylene stream 270 may be less than about 5 ppm by weight; alternatively, in a range of from about 0.5 ppm to about 3 ppm by weight.

Alternatively, the $C_{2-}$ stream 260 is routed through line 266 with valves in lines 260 and 268 and flows into second compression zone 267 to produce a pressurized $C_{2-}$ stream 268. The pressurized $C_{2-}$ stream 268 may have a pressure in a range of from about 100 psig to about 750 psig (about 0.68 MPag to about 5.17 MPag); alternatively, from about 200 psig to about 650 psig (about 1.37 MPag to about 4.48 MPag). Second compression zone 267 comprises one or more gas compressors, wherein the gas compressors may be any gas compressor suitable for use as disclosed herein. The pressurized $C_{2-}$ stream 268 flows into hydrogenation zone 265, wherein a portion of the acetylene comprising the pressurized $C_{2-}$ stream 268 is removed. The ethylene stream 270 may be recovered from hydrogenation zone 265, as described herein. In another alternative, the effluent of drying zone 245 is an alternate gas stream 272. The alternate gas stream 272 flows into alternate hydrogenation zone 275, wherein a portion of the acetylene comprising the alternate gas stream 272 is removed to produce a reduced gas stream 276. In an aspect, alternate hydrogenation zone 275 operates comparably to hydrogenation zone 265. The reduced gas stream 276 flows into alternate de-ethanizer zone 277, wherein an alternate ethylene stream 280 is recovered and an alternate $C_{3+}$ stream 282 is produced. In an aspect, alternate de-ethanizer zone 277 operates comparably to de-ethanizer zone 255. In a further aspect, the compositions of the alternate ethylene stream 280 and the alternate $C_{3+}$ stream 282 are comparable to the compositions of the ethylene stream 270 and the $C_{3+}$ stream 262, respectively. In an aspect, the alternate $C_{3+}$ stream 282 may be combined (not shown), with hydrocarbon recycle stream 201. The ethylene stream 270 and/or the alternate ethylene stream 280 flows into a cracking process effluent 25.

In an aspect, the cracking process effluent 25 comprises ethylene. An amount of ethylene in the cracking process effluent 25 may be in a range of from about 30 wt. % to about 95 wt. %; alternatively, about 30 wt. % to about 70 wt. %; or alternatively, about 40 wt. % to about 60 wt. %, based upon a total weight of the cracking process effluent 25.

In accordance with aspects of FIG. 1, the cracking process effluent 25 flows into oligomerization process 300. In an aspect, the cracking process effluent 25 flows continuously out of cracking process 200 and into oligomerization process 300. One having ordinary skill in the art will appreciate that, as presently described for the cracking process effluent 25, each stream described throughout the present disclosure flows continuously from one process to the next. The continuous flow of each stream is not explicitly stated for the sake of simplicity, but is a feature of each stream. Emanating from cracking process effluent 25 is an ethylene effluent 29. In an aspect, the ethylene effluent 29 comprises ethylene and may be routed to storage, and/or offered for sale. Within oligomerization process 300 a monomer may be contacted with an oligomerization catalyst in an oligomerization reactor to produce one or more oligomer products. In an aspect, the monomer may be an alpha-olefin; alternatively, a linear alpha-olefin; or alternatively, a normal alpha-olefin. In a further aspect, the monomer may comprise ethylene, propylene, or a combination thereof. When the monomer comprises ethylene, oligomerization process 300 may be an ethylene oligomerization process. In an aspect, the ethylene oligomerization process may be an ethylene trimerization process, an ethylene tetramerization process, or a combination thereof. When the process is an ethylene trimerization process, the oligomer product may be hexene, 1-hexene, or both. When the process is an ethylene tetramerization process, the oligomer product may be octene, 1-octene, or both. When the process is an ethylene trimerization and tetramerization process, the olefin product may comprise hexene, octene, 1-hexene, 1-octene, or any combination thereof. In a further aspect, oligomerization process 300 comprises an oligomerization reaction, wherein the oligomerization reaction may be a trimerization reaction, a tetramerization reaction, or a combination thereof. Methods of oligomerizing ethylene utilizing an oligomerization catalyst are disclosed in U.S. Pat. No. 8,680,003, which is incorporated herein by reference in its entirety.

Figure 3:
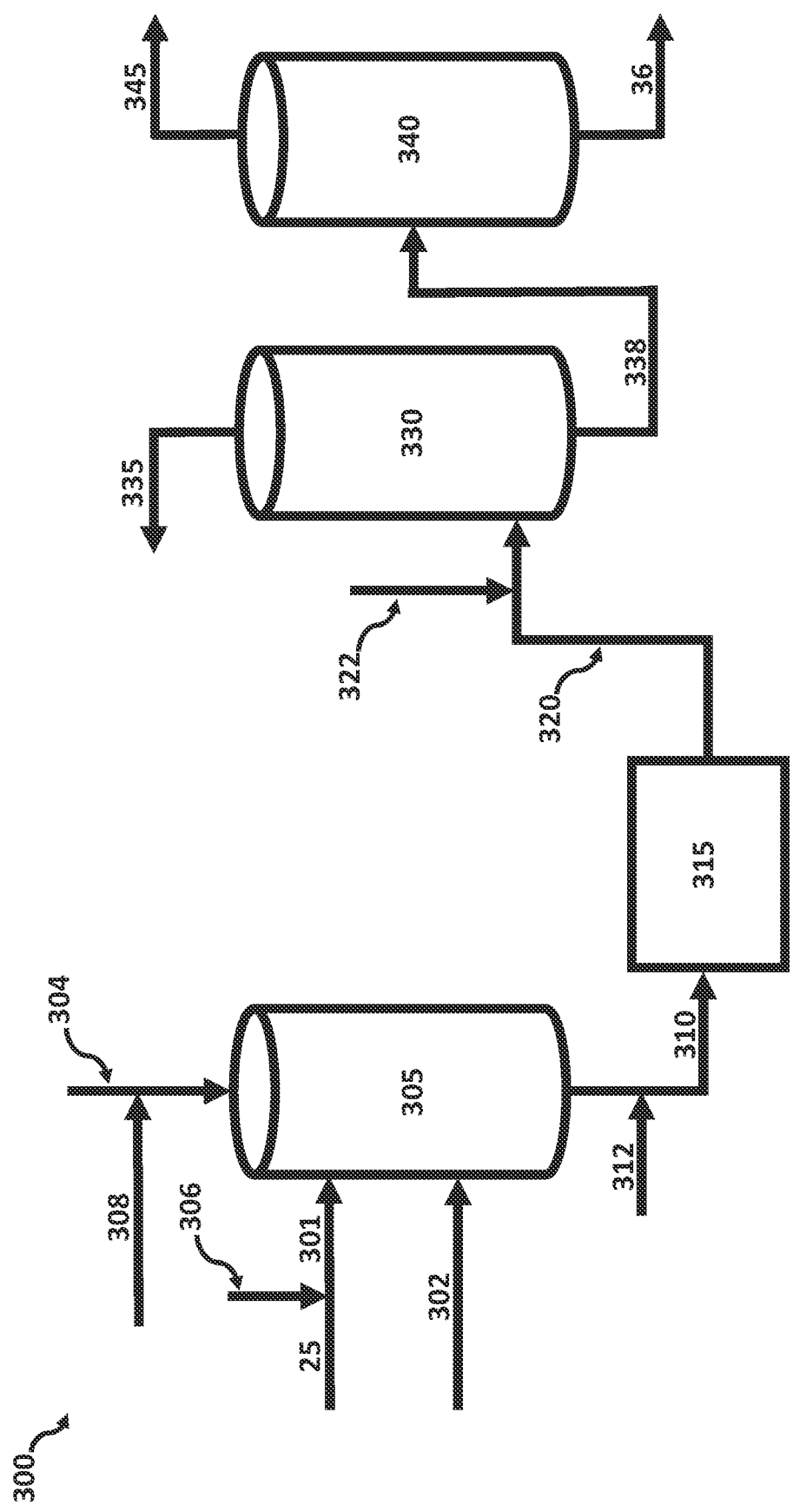
FIG. 3 illustrates a schematic of an oligomerization process.

Referring to FIG. 3, an aspect of oligomerization process 300 is described. The cracking process effluent 25 may be combined with an ethylene recycle stream 306 to form an oligomerization feed 301. In an aspect, the ethylene recycle stream 306 may be combined (not shown) with an ethylene recovery stream 335 as further described herein. Alternatively, the ethylene recycle stream 306 is combined with an ethylene source emanating from outside of integrated converting process 1000. In a further aspect, the ethylene recycle stream 306 comprises a light effluent of a polyethylene polymerization process. It is contemplated that some aspects of oligomerization process 300 may operate without the ethylene recycle stream 306. The oligomerization feed 301 flows into oligomerization reactor 305. In an aspect, the oligomerization feed 301 comprises ethane, ethylene or a combination thereof. A hydrogen feed 302 flows into oligomerization reactor 305. In an aspect, the hydrogen feed 302 may be combined with a stream from another section of an integrated reforming system of the present disclosure. For example, the hydrogen feed 302 may be combined with a hydrogen effluent 81 of FIG. 1, as further described herein. Without wishing to be limited by theory, performing an oligomerization reaction in the presence of hydrogen may enhance product selectivity, reduce formation of polymeric products, or both. It is contemplated that some aspects of oligomerization process 300 may operate without the hydrogen feed 302. An oligomerization catalyst stream 304 flows into oligomerization reactor 305. In an aspect, ethylene is contacted with an oligomerization catalyst in oligomerization reactor 305 in the presence of a solvent. In such aspects, a solvent feed 308 is combined with the oligomerization catalyst stream 304. For the purposes of the present disclosure, "solvent" refers to a diluent or a medium in which the oligomerization reaction occurs. The solvent may be any inert solvent suitable for use in an oligomerization reaction as disclosed herein. In an aspect, the solvent may be a hydrocarbon solvent, a halogenated hydrocarbon solvent, an aliphatic hydrocarbon solvent, a halogenated aliphatic hydrocarbon solvent, an aromatic hydrocarbon solvent, a halogenated aromatic solvent, or any combination thereof. In a further aspect, the solvent may be isobutane, cyclohexane, methylcyclohexane, 2,2,4-trimethylpentane, or combinations thereof. In an aspect, the solvent feed 308 may be combined (not shown), with a solvent recycle 345 as further disclosed herein; alternatively, a cyclohexane effluent 67 (e.g., see FIG. 10 or 11); or alternatively, with a raffinate stream 88 (e.g., see any of FIG. 1 or 5-11) as further disclosed herein. It is contemplated that some aspects of oligomerization process 300 may operate without the solvent feed 308.

In an aspect, the oligomerization catalyst comprises a selective oligomerization catalyst system. A selective oligomerization catalyst system suitable for use herein may comprise an N-phosphinyl amidine compound, a metal salt, and a metal alkyl; alternatively, an N-phosphinyl amidine compound, a metal salt, and an aluminoxane; alternatively, an N-phosphinyl amidine metal salt complex and a metal alkyl; or alternatively, an N-phosphinyl amidine metal salt complex and an aluminoxane. In a further aspect, the selective oligomerization catalyst system may comprise one or more neutral ligands. Selective oligomerization catalyst systems suitable for use herein are described in U.S. Pat. No. 8,680,003, as previously disclosed; wherein are listed all of the components that comprise the selective oligomerization catalyst system, the ratios of those components, and methods of combining the components to produce the selective oligomerization catalyst system. In an aspect, the selective oligomerization catalyst system may comprise [4-tert-butyl-$N_1$-(2,4,6-trimethylphenyl)-$N_2$(diisopropylphosphino) benzamidine](THF)$CrCl_3$ (i.e., PN Mes-tBuPh-DIP), [4-methoxy-$N_1$-(2,4,6-trimethylphenyl)-$N_2$(diisopropylphosphino)benzamidine](THF)$CrCl_3$ (i.e., PN Mes-MeOPh-DIP), $N_1$-(2,6-dimethylphenyl)-$N_2$-(di-n-butylphosphino)-2-p-tolylacetamidine](THF)$CrCl_3$ (i.e., PN Xyl-Bz-DnB), [$N_1$-(2,6-dimethylphenyl)-$N_2$-(diphenylphosphino)-2-p-tolylacetamidine](THF)$CrCl_3$; (i.e., PN Xyl-Bz-DPh), 7-(diisopropylphosphino)-1,5,7-triazabicyclo [4.4.0]dec-5-ene](THF)$CrCl_3$ (i.e., PN Guan-DIP), [1-[bis (1-methylethyl)phosphino-κP]-1,3,4,6,7,8-hexahydro-2H-pyrimido[1,2-a]pyrimidine-κN$_9$]trichloro(tetrahydrofuran)-chromium (i.e., PN Guan-DIP), [$N_1$-(2,4,6-trimethylphenyl)-$N_2$-(diisopropylphosphino)benzamidine] (THF)$CrCl_3$ (i.e., PN Mes Ph-DIP), [$N_1$-(2,6-dimethylphenyl)-$N_2$-(diethylphosphino)benzamidine](THF) $CrCl_3$ (i.e., PN Xyl-Ph-Det), [bis(diphenylphosphino)(n-hexyl)amine]trichlorochromium trichloro[N-(diphenylphosphino-κP)—N-(hexyl)-P,P-diphenylphosphinous amide-κP]-chromium (i.e., PNP DPh-Hex-DPh), [bis(diphenyl-phosphino)(cyclohexyl)amine] trichlorochromium, PNP trichloro[N-cyclohexyl-N-(diphenylphosphino-κP)—P,P-diphenylphosphinous amide-κP]-chromium (i.e., PNP DPh-Cy-DPh), PNP DPh-iPR-DPh2-OMe, PNP DPh-1MeiPR-DPh, or combinations thereof.

The contacting of ethylene with the selective oligomerization catalyst system within oligomerization reactor 305 may occur in any manner suitable and with the aid of the present disclosure. In some aspects, oligomerization reactor 305 may comprise a loop reactor, a tubular reactor, a continuous stirred tank reactor (CSTR), or combinations thereof. In a particular aspect, a suspension formed between the selective oligomerization catalyst system and a solvent may be agitated to maintain a uniform selective oligomerization catalyst system concentration throughout the suspension; or alternatively, a solution formed between the selective oligomerization catalyst system and a solvent may be agitated to maintain the selective oligomerization catalyst system in solution throughout the oligomerization process. In an aspect, the oligomerization reaction may be carried out in one or more oligomerization reactors. In an aspect, the oligomerization reaction may be performed under suitable reaction conditions encompassing one or more of catalyst concentration, reaction temperatures, reaction pressure, and/or reaction time(s). In an aspect, the concentration of the selective oligomerization catalyst system can be at least 1×10 equivalents/liter; alternatively, at least 2×10 equivalents/liter; or alternatively, at least 5×10 equivalents/liter. The temperature within oligomerization reactor 305 may be any temperature suitable for an oligomerization reaction of ethylene. In an aspect, the temperature is in range that is low enough to minimize or avoid decreases in the activity of the selective oligomerization catalyst system, and high enough to minimize or avoid the formation and/or precipitation of polymeric products. In a further aspect, the temperature within oligomerization reactor 305 may be at least 0° C.; alternatively, at least 10° C.; alternatively, at least 20° C.; or alternatively, at least 30° C. In some aspects, the temperature within oligomerization reactor 305 may be in a range of from about 0° C. to about 200° C.; alternatively, from about 10° C. to about 160° C.; alternatively, from about 20° C. to about 140° C.; or alternatively, from about 30° C. to about 120° C. The pressure within oligomerization reactor 305 may be any pressure suitable for an oligomerization reaction of ethylene. In an aspect, the pressure is in a range that is high enough to avoid decreases in the activity of the selective oligomerization catalyst system. In a further aspect, the pressure within oligomerization reactor 305 may be in a range of from about atmospheric pressure (about 0 psig) to about 5000 psig (about 0.101 MPag to about 34.5 MPag); alternatively, from about 50 psig to about 4000 psig (about 0.345 MPag to about 27.6 MPag); alternatively, from about 100 psig to about 3600 psig (about 0.68 MPag to about 24.8 MPag); or alternatively, from about 150 psig to about 2000 psig (about 1.03 MPag to about 13.8 MPag). In a particular aspect, the oligomerization reaction can have a single pass conversion of ethylene of at least about 30 wt. %; alternatively, at least about 35 wt. %; alternatively, at least about 40 wt. %; or alternatively, at least about 45 wt. %.

As shown in FIG. 3, an oligomerization reactor effluent 310 flowing from oligomerization reactor 305 comprises all components that can be present in and can be removed from the oligomerization reactor. The oligomerization reactor effluent 310 may comprise oligomer product(s), by-product (s), co-product(s), side-product(s), light hydrocarbons, heavy hydrocarbons, unreacted monomer(s), selective oligomerization catalyst system, solvent(s), and other reactor components. In an aspect, the oligomerization reactor effluent 310 comprises hexene, octene, 1-hexene, 1-octene, alkylcyclopentane(s), solvent(s), cyclohexane, unreacted ethylene and combinations thereof. In a further aspect, the oligomerization reactor effluent 310 comprises $C_{10}$ hydrocarbons, $C_{12}$ hydrocarbons, $C_{14+}$ hydrocarbons, or combinations thereof. It will be appreciated by one having skill in the art that streams 301, 302, 304, and 310 may be located anywhere on oligomerization reactor 305 suitable to allow the ethylene to thoroughly contact the selective oligomerization catalyst system within oligomerization reactor 305.

A catalyst kill stream 312 may be combined with oligomerization reactor effluent 310. The catalyst kill stream 312 comprises a catalyst deactivation composition that may deactivate, either partially or completely, the selective oligomerization catalyst system. It is contemplated that some aspects of oligomerization process 300 may not utilize the catalyst kill stream 312. Filter 315 can remove particulates (e.g., catalyst fines and undesirable polymeric products), from the oligomerization reactor effluent 310. While not wishing to be bound by theory, it is believed that higher reactor and stream temperatures can inhibit solidification of undesirable polymer particles. When the oligomerization reactor effluent 310 is maintained at a high temperature, fewer particulates can form and filter 315 may be unnecessary. In aspects where process conditions favor particulate formation (e.g., cooling of the oligomerization reactor effluent 310), filter 315 can be used. It is contemplated that some aspects of oligomerization process 300 may not utilize filter 315.

A process stream 320 comprises the effluent of filter 315 or a continuation of the oligomerization reactor effluent 310, wherein the process stream 320 comprises little or no particulates. The process stream 320 flows into a first separator 330 to produce an ethylene recovery stream 335 and an oligomer effluent 338. The ethylene recovery stream 335 may comprise methane, ethane, ethylene, propane, propylene, butane, or combinations thereof. In an aspect, the ethylene recovery stream 335 may be further processed (not shown) to recover a higher purity of the ethylene concentration thereof. The ethylene recovery stream 335 may be combined (not shown) with the ethylene recycle stream 306 as disclosed herein. In an aspect, a heavies feed 322 is optionally combined with process stream 320 to form an inlet into the first separator 330. The heavies feed 322 may comprise the desired oligomer products and heavy hydrocarbons as further described herein. In an aspect, the heavies feed 322 may be an effluent of a polyethylene production plant. The oligomer effluent 338 flows into a second separator 340 to produce a solvent recycle 345 and an oligomerization process effluent 36. The solvent recycle 345 may be combined (not shown), with the solvent feed 308 disclosed herein. In an aspect, the solvent recycle 345 may comprise cyclohexane. The first separator 330 and the second separator 340 may operate in any manner suitable for producing the effluents thereof. In a further aspect, each of the first separator 330 and the second separator 340 comprise at least one fractionator.

In an aspect, the oligomerization process effluent 36 contains an oligomer product comprising $C_6$ and $C_8$ olefins. In an aspect, the $C_6$ olefins comprise hexene, 1-hexene, or a combination thereof, and the $C_8$ olefins comprise octene, 1-octene, or a combination thereof. In an aspect, the oligomerization process effluent 36 contains an oligomer product comprising at least 60 wt. % $C_6$ and $C_8$ olefins; alternatively, at least 70 wt. % $C_6$ and $C_8$ olefins; alternatively, at least 80 wt. % $C_6$ and $C_8$ olefins; alternatively, at least 85 wt. % $C_6$ and $C_8$ olefins; or alternatively, at least 90 wt. % $C_6$ and $C_8$ olefins.

In an aspect, the oligomerization process effluent 36 may comprise $C_6$ olefins, wherein an amount of $C_6$ olefins may be at least 60 wt. %; alternatively, at least 70 wt. %; alternatively, at least 75 wt. %; alternatively, at least 80 wt. %; alternatively, at least 85 wt. %; or alternatively, at least 90 wt. %, based upon a total weight of the oligomerization process effluent 36. In a further aspect, the oligomerization process effluent 36 may comprise 1-hexene, wherein an amount of 1-hexene may be at least 85 wt. %; alternatively, at least 87.5 wt. % alternatively, at least 90 wt. %; alternatively, at least 92.5 wt. %; alternatively, at least 95 wt. %; alternatively, at least 97 wt. %; or alternatively, at least 98 wt. %. In an aspect, the amount of 1-hexene in the oligomerization process effluent 36 may be in a range of from about 85 wt. % to about 99.9 wt. %; alternatively, about 87.5 wt. % to about 99.9 wt. %; alternatively, about 90 wt. % to about 99.9 wt. %; alternatively, about 92.5 wt. % to about 99.9 wt. %; alternatively, about 95 wt. % to about 99.9 wt. %; alternatively, about 97 wt. % to about 99.9 wt. %; or alternatively, about 98 wt. % to about 99.9 wt. %.

In a further aspect, the oligomerization process effluent 36 may comprise $C_8$ olefins wherein an amount of $C_8$ olefins may be at least 60 wt. %; alternatively, at least 70 wt. %; alternatively, at least 75 wt. %; alternatively, at least 80 wt. %; alternatively, at least 85 wt. %; or alternatively, at least 90 wt. %, based upon a total weight of the oligomerization process effluent 36. In a further aspect, the oligomerization process effluent 36 may comprise 1-octene wherein an amount of 1-octene may be at least 85 wt. %; alternatively, at least 87.5 wt. % alternatively, at least 90 wt. %; alternatively, at least 92.5 wt. %; alternatively, at least 95 wt. %; alternatively, at least 97 wt. %; or alternatively, at least 98 wt. %. In an aspect, the amount of 1-octene in the oligomerization process effluent 36 may be in a range of from about 85 wt. % to about 99.9 wt. %; alternatively, about 87.5 wt. % to about 99.9 wt. %; alternatively, about 90 wt. % to about 99.9 wt. %; alternatively, about 92.5 wt. % to about 99.9 wt. %; alternatively, about 95 wt. % to about 99.9 wt. %; alternatively, about 97 wt. % to about 99.9 wt. %; or alternatively, about 98 wt. % to about 99.9 wt. %.

With regards to FIG. 1, the oligomerization process effluent 36 flows into first fractionation process 50, wherein a hexene effluent 52 and an octene effluent 54 are recovered. The first fractionation process 50 produces a heavies effluent 56 that may comprise heavy hydrocarbons and the spent selective oligomerization catalyst system. The heavy hydrocarbons may comprise $C_{9+}$ hydrocarbons, $C_{9+}$ oligomers formed by the oligomerization reaction, polymeric products formed by the oligomerization reaction, or combinations thereof. In an aspect, the $C_{9+}$ oligomers comprise decenes, dodecenes, tetradecenes, and combinations thereof. One having skill in the art will appreciate that first fractionation process 50 may operate in any manner suitable for producing the disclosed effluents. For example, first fractionation process 50 may comprise a series of separation units, e.g., flash distillation columns, fractionating distillation columns, liquid-liquid extraction units.

In an aspect, a first portion of the hexene effluent 52 is used as a hexene feed 53. A remaining portion of the hexene effluent 52 and the octene effluent 54 may be routed to storage, or offered for sale. In an aspect, the hexene feed 53 is optionally combined with a naphtha feed 60 to form a treater feed 65. The naphtha feed 60 may comprise non-aromatic hydrocarbons containing at least six carbon atoms. In a further aspect, the naphtha feed 60 may comprise a mixture of hydrocarbons comprising $C_6$ to $C_8$ hydrocarbons comprising up to about 15 wt. % of $C_{5-}$ hydrocarbons and up to about 10 wt. % of $C_{9+}$ hydrocarbons, wherein the weight percentage is based upon the total weight of naphtha feed 60. In a particular aspect, the naphtha feed 60 may be a light naphtha with a boiling range of about 20° C. to about 235° C., wherein the naphtha feed may contain one or more of aliphatic, naphthenic, and/or paraffinic hydrocarbons. It is contemplated that some aspects of integrated converting system 1000 may operate without the naphtha feed 60.

As further shown in FIG. 1, the treater feed 65 flows into hydrotreating process 70. In an aspect, hydrotreating process 70 comprises at least one hydrogenation reactor. At least a portion of the oligomer products within the treater feed 65 may flow into the hydrogenation reactor and be contacted with a hydrogenation catalyst to yield a hydrogenation effluent (not shown). In aspects where the oligomer products comprise hexene, the hydrogenation effluent comprises hexane. In aspects where the oligomer products comprise octene, the hydrogenation effluent comprises octane. In such aspects, the oligomer products may be contacted with the hydrogenation catalyst in any manner suitable for the formation of hexane. In an aspect, the hydrogenation catalyst comprises one or more of a hydrogenation catalyst(s) comprising nickel (Ni), palladium (Pd), platinum (Pt), iridium (Ir), and/or ruthenium (Ru). Within hydrotreating process 70, the hydrogenation effluent passes through a purification stage whereby an aromatization feed 75 comprising hexane (e.g., n-hexane) is recovered. Further processes within hydrotreating process 70 (e.g., fractionation), may impact the amounts or concentrations of sulfur, nitrogen, and/or aromatic compounds which enter hydrotreating process 70, thereby reducing the amounts of sulfur, nitrogen, and/or aromatic compounds of the aromatization feed 75. In an aspect, hydrotreating process 70 comprises a sulfur removal system. Without wishing to be bound by theory, lower amounts of sulfur, nitrogen, and/or aromatic compounds within a feedstock to aromatization process 400 may result in slower degradation and deactivation of an aromatization catalyst therein, beneficially leading to fewer plant turnarounds and greater aromatics selectivity. In a further aspect, processes within hydrotreating process 70 may enhance the cetane number, the density and/or the smoke point of the components of aromatization feed 75.

In an aspect, an amount of sulfur in the aromatization feed 75 may be in a range of from about 0.01 ppm to about 5 ppm; or alternatively, from about 0.05 to about 0.5 ppm. In an aspect, an amount of nitrogen in the aromatization feed 75 may be in a range of from about 0.01 ppm to about 5 ppm; or alternatively, from about 0.05 to about 0.5 ppm. In an aspect, an amount of aromatic components in the aromatization feed 75 may be in a range of from about 0.01 ppm to about 1 ppm; or alternatively, from about 0.02 to about 0.2 ppm. The ppm values are weight-weight values based upon the total weight of the aromatization feed 75.

With reference to FIG. 1, the aromatization feed 75 flows into aromatization process 400. Aromatization process 400 comprises an aromatization reactor system, wherein acyclic oligomers are contacted with an aromatization catalyst and undergo an aromatization reaction that produces arenes. In a further aspect, the aromatization reaction converts 1-hexene into benzene. Methods for converting 1-hexene into benzene are disclosed, for instance, in U.S. Pat. No. 7,932,425, which is incorporated herein by reference in its entirety. Any suitable method of producing benzene disclosed in U.S. Pat. No. 7,932,425 may be utilized herein. It is contemplated that aromatization process 400 may be utilized with acyclic hydrocarbons other than 1-hexene to produce arenes other than benzene.

Figure 4:
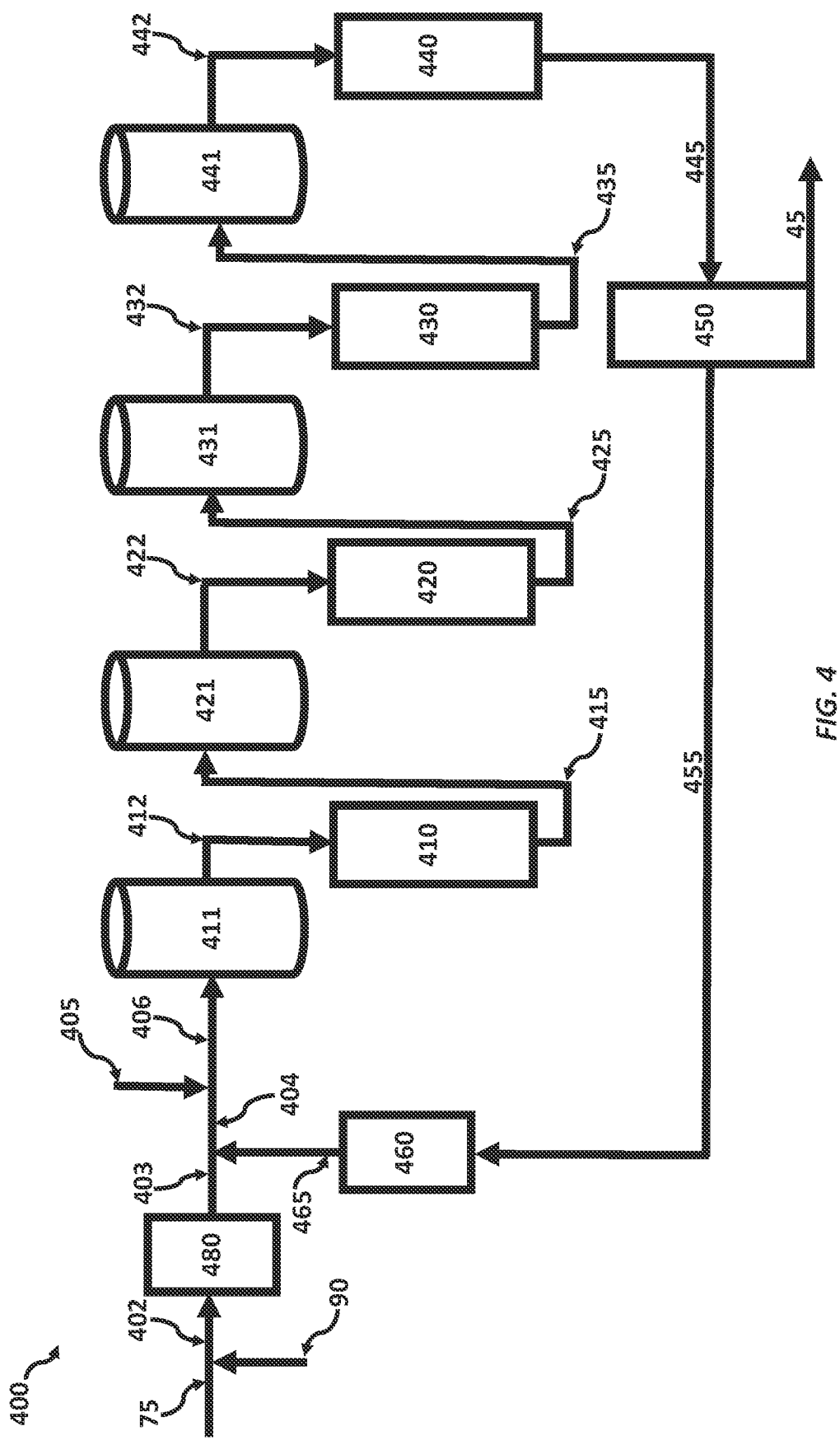
FIG. 4 illustrates a schematic of an aromatization process.

Referring to FIG. 4, an aspect of aromatization process 400 is described. In the aspect shown, the aromatization reactor system comprises a catalytic reactor system wherein four aromatization reactors are serially connected, i.e., reactors 410, 420, 430, and 440. However, the catalytic reactor system may comprise any suitable number and/or configuration of aromatization reactors, including one, two, three, five, six, or more reactors, which may be arranged either in series or in parallel. As aromatization reactions are highly endothermic, large temperature drops may occur across the reactors 410, 420, 430, and 440. Therefore, each reactor 410, 420, 430, and 440 in the series may comprise a corresponding furnace 411, 421, 431, and 441, respectively, for reheating components back to a desired temperature for maintaining a desired reaction rate. Alternatively, one or more reactors 410, 420, 430, and 440 may share a common furnace where practical. All of reactors 410, 420, 430, and 440, furnaces 411, 421, 431, and 441, and associated piping may be referred to herein as an aromatization zone.

In an aspect, the aromatization feed 75 and an optional raffinate recycle 90, as disclosed further herein, combine to form a mixed feed 402 that flows into purification process 480. Purification process 480 employs known processes to purify the mixed feed 402, which may include fractionation, to remove impurities, such as oxygenates, sulfur, and/or metals. In an aspect, purification process 480 comprises a sulfur removal system. In a further aspect, the sulfur removal system comprises a staged combustion air (SCA) pre-treater, an SCF/SCG sulfur guard, or both. Emanating from purification process 480 is a purified feed 403. The purified feed 403 may be combined with a dry hydrogen recycle stream 465 to produce a hydrogen-rich purified feed 404. An oxygenate and/or nitrogenate stream 405 (i.e., O/N stream) may be combined with the hydrogen-rich purified feed 404 to produce an aromatization reactor feed 406. The oxygenate and/or nitrogenate compound(s) may be fed to the catalytic reactor system at one or more locations in addition to the O/N stream 405, or as an alternative to the O/N stream 405, as described in more detail herein. It is contemplated that some aspects of aromatization process 400 may operate without purification process 480, wherein the mixed feed 402 continues directly into stream 403.

In aspects, the aromatization reactor feed 406 is pre-heated in a first furnace 411, which heats the contents of feed 406 to a desired temperature, thereby producing a first aromatization reactor feed 412. The first aromatization reactor feed 412 flows into a first aromatization reactor 410, where it is contacted with an aromatization catalyst under suitable reaction conditions (e.g., suitable temperature and pressure) that aromatize one or more components in the feed, thereby increasing the arene content thereof. A first aromatization reactor effluent 415 comprising arenes (e.g., benzene), unreacted feed, and optionally other hydrocarbon compounds or byproducts is recovered from the first aromatization reactor 410.

The first aromatization reactor effluent 415 is then pre-heated in a second furnace 421, which heats the contents of stream 415 to a desired temperature, thereby producing a second aromatization reactor feed 422. The second aromatization reactor feed 422 flows into a second aromatization reactor 420, where it is contacted with an aromatization catalyst under suitable reaction conditions for aromatizing one or more components in the feed to increase the arene content thereof. A second aromatization reactor effluent 425 comprising arenes (e.g., benzene), unreacted feed, and optionally other hydrocarbon compounds or byproducts are recovered from the second aromatization reactor 420.

The second aromatization reactor effluent 425 is then pre-heated in a third furnace 431, which heats the contents of stream 425 to a desired temperature, thereby producing a third aromatization reactor feed 432. The third aromatization reactor feed 432 flows into a third aromatization reactor 430, where it is contacted with an aromatization catalyst under suitable reaction conditions for aromatizing one or more components in the feed to increase the arene content thereof.

A third aromatization reactor effluent 435 comprising arenes (e.g., benzene), unreacted feed, and optionally other hydrocarbon compounds or byproducts are recovered from the third aromatization reactor 430.

The third aromatization reactor effluent 435 is then preheated in a fourth furnace 441, which heats the contents of stream 435 to a desired temperature, thereby producing a fourth aromatization reactor feed 442. The fourth aromatization reactor feed 442 is then fed into a fourth aromatization reactor 440, where it is contacted with an aromatization catalyst under suitable reaction conditions for aromatizing one or more components in the feed to increase the arene content thereof. A fourth aromatization reactor effluent 445 comprising arenes (e.g., benzene), unreacted feed, and optionally other hydrocarbon compounds or byproducts is recovered from the fourth aromatization reactor 440.

The fourth aromatization reactor effluent 445 flows into a hydrogen separation process 450, wherein a recovered hydrogen stream 455 is separated from a reformate effluent 45. The reformate effluent 45 comprises the aromatization reaction products from reactors 410, 420, 430, and 440, and optionally, aromatization reaction by-product(s) and/or side-product(s), unreacted feed, other hydrocarbons, or combinations thereof. In an aspect, the aromatization reaction side-products comprise toluene, xylene, ethylbenzene, diethylbenzene, mesitylene, hexamethylbenzene, or combinations thereof. The recovered hydrogen stream 455 is dried in dryer 460 for forming a dry hydrogen recycle stream 465, which may be recycled into the purified feed 403 as disclosed herein. Hydrogen separation processes are known in the art and are described, e.g., in U.S. Pat. Nos. 5,401,386; 5,877,367; and 6,004,452, each of which is incorporated herein by reference in its entirety. For the sake of simplicity, FIG. 4 does not illustrate the byproduct streams that are removed from the catalytic reactor system at various points throughout the system. However, persons of ordinary skill in the art are aware of the composition and location of such byproduct streams. Also, while FIG. 4 shows the O/N stream 405 being added to the hydrogen-rich purified feed 404, persons of ordinary skill in the art will appreciate that the oxygenate and/or nitrogenate may be added to any of streams 402, 403, 404, 406, 412, 415, 422, 425, 432, 435, 442, 445, 455, and 465, or combinations thereof. Some aspects of the aromatization process may operate in the absence of hydrogen separation process 450 and dryer 460, wherein the recovered hydrogen stream 455 and the dry hydrogen recycle stream 465 are not present. In such aspects, the fourth aromatization reactor effluent 445 flows directly into and comprises the composition of the reformate effluent 45.

In various aspects, the catalytic reactor system described herein may comprise a fixed catalyst bed system, a moving catalyst bed system, a fluidized catalyst bed system, or combinations thereof. Such reactor systems may be batch or continuous systems. In an aspect, the catalytic reactor system is a fixed-bed system comprising one or more fixed-bed reactors. In a fixed-bed system, the aromatization reactor feed may be preheated in furnace tubes and passed into at least one reactor that contains a fixed bed of the catalyst. The flow of the aromatization reactor feed can be upward, downward, or radially through the reactor. In various aspects, the catalytic reactor system described herein may be operated as an adiabatic catalytic reactor system or an isothermal catalytic reactor system. As used herein, the terms "catalytic reactor" and "reactor" refer interchangeably to the reactor vessel, reactor internals, and associated processing equipment, including but not limited to the catalyst, inert packing materials, scallops, flow distributors, center pipes, reactor ports, catalyst transfer and distribution system, furnaces and other heating devices, heat transfer equipment, and piping.

In an aspect, the catalytic reactor system is an aromatization reactor system comprising at least one aromatization reactor and its corresponding processing equipment. As used herein, the terms "aromatization," "aromatizing," and "reforming" refer to the treatment of a feed to provide an arene-enriched product wherein an arene content of the product is greater than that of the feed. Typically, one or more components of the feed undergo one or more reforming reactions to produce arenes. Some of the reforming reactions that occur within the aromatization reactor system include dehydrocyclization reactions of acyclic hydrocarbons to arenes (e.g., 1-hexene to benzene), dehydrogenation reactions of cyclohexanes to arenes, dehydroisomerization reactions of alkylcyclopentanes to arenes, or combinations thereof. Depending upon the composition of the feed, additional reactions may also occur, including dealkylation reactions of alkylbenzenes, isomerization reactions of paraffins, hydrocracking reactions that produce light gaseous hydrocarbons, e.g., methane, ethane, ethylene, propane propylene, and butane, or combinations thereof. Particular aspects of the integrated reforming systems described herein utilize dehydrocyclization reactions of 1-hexene, n-hexane, or a combination thereof to produce benzene. In a further aspect, the integrated reforming systems utilize dehydrogenation reactions of cyclohexane produce benzene.

In an aspect, the aromatization reaction occurs under process conditions that thermodynamically favor the dehydrocyclization reaction and limit undesirable hydrocracking reactions. Pressures within the reactor(s) may be in a range of from about 0 psig to about 500 psig (about 0 MPag to about 3.45 MPag), such as about 25 psig to about 300 psig (about 0.17 MPag to about 2.07 MPag). The operating temperatures include reactor inlet temperatures in a range of from about 370° C. to about 565° C., including about 480° C. to about 540° C. A molar ratio of hydrogen to hydrocarbons (e.g., 1-hexene) in the aromatization reactor feed may be in a range of from about 0.1:1 to about 20:1, such as from about 1:1 to about 6:1.

The aromatization reaction of the present disclosure may be characterized, in some aspects, by a conversion of some or all of a $C_6$ stream (including but not limited to 1-hexene) to benzene based upon a total amount-by-weight of $C_6$ stream feed, including 1-hexene, fed to the aromatization reactor. In an aspect, the conversion of $C_6$ species, such as 1-hexene, to benzene is greater than about 40 wt. %; alternatively, greater than about 50 wt. %; alternatively, greater than about 60 wt. %; or alternatively, greater than about 70 wt. %.

The aromatization reaction of the present disclosure may be characterized by a selectivity of $C_6$ feed stream species, e.g., 1-hexene, to benzene based upon a total amount-by-weight of 1-hexene converted in the aromatization reactor. In an aspect, the selectivity of 1-hexene to benzene is greater than about 50 wt. %; alternatively, greater than about 60 wt. %; alternatively, greater than about 70 wt. %; or alternatively, greater than about 75 wt. %.

Various types of aromatization catalysts may be used with the catalytic reactor system disclosed herein. In an aspect, the aromatization catalyst is a non-acidic catalyst that comprises an inorganic support, a Group VIII metal, and one or more halides. Suitable halides include chloride, fluoride, bromide, iodide, or combinations thereof. Suitable Group VIII metals include iron, cobalt, nickel, ruthenium, rhodium, palladium, osmium, iridium, and platinum, and combinations thereof. Examples of catalysts suitable for use with the catalytic reactor system described herein are the AROMAX® brand of catalysts (Chevron Phillips Chemical Company LLC, The Woodlands, TX, USA) including the catalysts discussed in U.S. Pat. Nos. 6,812,180; 7,153,801; and 7,932,425, each of which is incorporated by reference herein in its entirety.

Inorganic supports for the aromatization catalyst of the present disclosure may generally include any inorganic oxide. These inorganic oxides include bound large pore aluminosilicates (zeolite supports), amorphous inorganic oxides, and mixtures thereof. Large pore aluminosilicates include, but are not limited to, L-zeolite, Y-zeolite, mordenite, omega zeolite, beta zeolite and the like. Amorphous inorganic oxides include, but are not limited to, aluminum oxide, silicon oxide, and titania. Suitable bonding agents for the inorganic oxides include, but are not limited to, silica, alumina, clay(s), titania, and magnesium oxide.

In an aspect, the support is a bound potassium (K) L-type zeolite, or KL zeolite. The term "KL zeolite" as used herein refers to L-type zeolites in which the principal cation "M" incorporated in the zeolite is potassium. A KL zeolite may be cation-exchanged or impregnated with another metal and one or more halides to produce, for instance, a platinum (Pt)-impregnated, halide comprising zeolite, or a KL supported Pt-halide zeolite catalyst.

In an aspect, the Group VIII metal may be platinum. The platinum and optionally one or more halides may be added to the zeolite support by any suitable method, for example via impregnation with a solution of a platinum-containing compound and one or more halide-containing compounds. For example, the platinum-containing compound can be any decomposable platinum-containing compound. Examples of such compounds include, but are not limited to, ammonium tetrachloroplatinate, chloroplatinic acid, diamineplatinum (II) nitrite, bis-(ethylenediamine)platinum (II) chloride, platinum (II) acetylacetonate, dichlorodiamine platinum, platinum (II) chloride, tetraamineplatinum (II) hydroxide, tetraamineplatinum chloride, and tetraamineplatinum (II) nitrate.

In a further aspect, the catalyst may be a large pore zeolite support with a platinum-containing compound and at least one organic ammonium halide compound. The organic ammonium halide compound may comprise one or more compounds represented by the formula $N(R)_4X$, where X is a halide, R represents a hydrogen or a substituted or unsubstituted carbon chain molecule having 1-20 carbons, and each R may be the same or different. In an aspect, R is selected from the group consisting of methyl, ethyl, propyl, butyl, and combinations thereof, more specifically methyl. Examples of suitable organic ammonium compounds are represented by the formula $N(R)_4X$, and may include ammonium chloride, ammonium fluoride, and tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, and combinations thereof.

In certain aspects of the present disclosure, an oxygenate, a nitrogenate, or both may be added to one or more process streams and/or components in the catalytic reactor system. While not being bound by theory, the oxygenate and/or nitrogenate (e.g., water) may be beneficial in activating, preserving, and/or increasing the productivity of certain types of aromatization catalysts as described, for instance, in U.S. Pat. No. 7,932,425. In an aspect, the aromatization feed 75 and the optional raffinate recycle 90 are substantially free of sulfur, metals, and other known poisons for aromatization catalysts, and are initially substantially free of oxygenates and nitrogenates. If present, such poisons can be removed using methods known to those skilled in the art. In some aspects, the aromatization feed 75 and the optional raffinate recycle 90 can be purified by first using conventional hydrofining techniques, then using sorbents to remove the remaining poisons. Such hydrofining techniques and sorbents are included in the purification process associated with the oxygenate and/or nitrogenate described below.

As used herein, the term "oxygenate" refers to water or any chemical compound that forms water under catalytic aromatization conditions, such as oxygen, oxygen-containing compounds, hydrogen peroxide, alcohols, ketones, esters, ethers, carbon dioxide, aldehydes, carboxylic acids, lactones, ozone, and carbon monoxide, including combinations thereof. In one aspect, water and/or steam is used as the oxygenate. In another aspect, oxygen may be used as the oxygenate, wherein such oxygen converts to water in situ within one or more aromatization reactors under typical aromatization conditions, or within one or more hydrofining catalyst or sorbent beds under normal hydrofining conditions. Furthermore, the oxygenate may be any alcohol-containing compound. Specific examples of suitable alcohol-containing compounds are methanol, ethanol, propanol, isopropanol, butanol, t-butanol, pentanol, amyl alcohol, hexanol, cyclohexanol, phenol, or combinations thereof.

As used herein, the term "nitrogenate" refers to ammonia or any chemical compound that forms ammonia under catalytic aromatization conditions such as nitrogen, nitrogen-containing compounds, alkyl amines, aromatic amines, pyridines, pyridazines, pyrimidines, pyrazines, triazines, heterocyclic N-oxides, pyrroles, pyrazoles, imidazoles, triazoles, nitriles, amides, ureas, imides, nitro compounds, and nitroso compounds, including combinations thereof. While not wanting to be limited by theory, it is believed that the ammonia will improve catalyst activity in much the same way as the water. Additionally, all the methods of addition and control for oxygenates described herein can also be fully applied additionally or alternatively to the methods of addition and control for nitrogenates.

One of ordinary skill in the art will appreciate that any of the oxygenates, nitrogenates, or mixtures thereof described herein may be used alone, in combination, or further combined to produce other suitable oxygenates or nitrogenates. In some aspects, the oxygenate and nitrogenate may be contained within a single bifunctional compound. The oxygenate and/or nitrogenate may be added in any suitable physical phase such as a gas, a liquid, or a combination thereof. The oxygenate and/or nitrogenate may be added to one or more process streams and/or components via any suitable means for their addition, for example a pump, injector, sparger, bubbler, or the like. The oxygenate and/or nitrogenate may be introduced as a blend with a carrier. In some aspects, the carrier is selected from hydrogen, a hydrocarbon, nitrogen, a noble gas, or mixtures thereof. In an aspect, the carrier is hydrogen. In a further aspect, the oxygenate and/or nitrogenate may be added at various locations within the aromatization process, at any time during the service life of the aromatization catalyst, and in any suitable manner. In a still further aspect, the addition of oxygenate and/or nitrogenate functions to activate the aromatization catalyst, to increase the useful life of the aromatization catalyst, to increase the selectivity and/or productivity of the aromatization catalyst, and combinations thereof.

In an aspect, the existing oxygenate and/or nitrogenate content of a stream to which the oxygenate and/or nitrogenate is to be added is measured and/or adjusted prior to addition of the oxygenate and/or nitrogenate. For example, and with reference to FIG. 4, one or more feed streams such as the aromatization feed 75, the raffinate recycle 90, the mixed feed stream 402, or the dry hydrogen recycle stream 465 may be measured for oxygenate and/or nitrogenate content, and the oxygenate and/or nitrogenate content thereof adjusted prior to the addition of the oxygenate and/or nitrogenate. Likewise, the same streams may be measured for nitrogenate content and/or the nitrogenate content thereof adjusted prior to the addition of the nitrogenate. Generally, a raw or untreated feed stream such as the aromatization feed 75 may contain some amount of oxygenate or nitrogenate when it flows into the catalytic reaction system described herein. In addition, and depending on one or more of the plant configuration, the duration of feed storage and/or the weather/storage conditions, the feed may absorb oxygenates or nitrogenates from the air. In order to accurately control the amount of oxygenate(s) or nitrogenate (s) flowing into one or more of the aromatization reactors (e.g., reactors 410, 420, 430, 440), the amount of oxygenate and/or nitrogenate in one or more feed streams to the reactors may be measured, adjusted, or both.

In an aspect, the oxygenate and/or nitrogenate content of a given stream such as a feed stream may be measured, for example, with a real-time, in-line analyzer (not shown). In response to such measurement(s), the oxygenate and/or nitrogenate content of the stream may be adjusted by treating and/or adding oxygenate and/or nitrogenate to the stream to obtain a desired amount of oxygenate and/or nitrogenate therein. In an aspect, a control loop links the analyzer to a treater and an oxygenate and/or nitrogenate injector such that the amount of oxygenate and/or nitrogenate in one or more streams is controlled in response to an oxygenate and/or nitrogenate set point for such streams. In some aspects, the measuring and/or adjusting of the oxygenate and/or nitrogenate content and associated equipment such as treaters and/or chemical injectors are included as part of the purification process 480. The oxygenate and/or nitrogenate treaters vary based on the type and amounts of oxygenate and/or nitrogenate. In aspects where the oxygenate comprises water, beds of sorbent materials may be used. These sorbent beds are commonly known as driers. In aspects where the oxygenate comprises oxygen, the use of treaters which convert the oxygen to water can be used in combination with driers. In further aspects where the nitrogenate comprises a basic chemical, one or more beds of sorbent materials may be used.

In an aspect, one or more streams such as the aromatization feed 75, the raffinate recycle 90, the mixed feed 402, and/or the dry hydrogen recycle stream 465 are treated prior to the addition of oxygenate and/or nitrogenate. In such an aspect, measuring the oxygenate and/or nitrogenate content of the streams before such treatment may optionally be omitted. If there is no apparatus for readily measuring the oxygenate and/or nitrogenate content of the feed, then it may be difficult to reliably maintain a desired level in the aromatization reactors.

Treating one or more streams prior to the addition of the oxygenate and/or nitrogenate may aid in the overall control of the amount of water and/or ammonia in one or more streams flowing into the aromatization reactors by removing variability in the oxygenate and/or nitrogenate content in such streams. Treating such streams provides a consistent, baseline amount of oxygenate and/or nitrogenate in such streams for the addition of oxygenate and/or nitrogenate to form an oxygenated stream such as the aromatization reactor feed 406. When the reactor feed is sufficiently free of oxygenate(s) and/or nitrogenate(s), precise quantities of the oxygenate(s) and/or nitrogenate can be added to the reactor feeds such that the amount of oxygenate and/or nitrogenate (s) in the reactors may be reliably maintained. In an aspect, purification process 480 may include a hydrocarbon dryer that dries the feed streams (e.g., aromatization feed 75) to a suitable moisture content. In other aspects, purification process 480 may include a reduced copper bed or a bed of triethyl aluminum on silica for use in removing oxygenates. In still further aspects, the reduced copper bed or a bed of triethyl aluminum on silica is used in combination with the hydrocarbon dryer. Similarly, dryer 460 can be used to dry the recovered hydrogen stream 455 and/or other process streams (e.g., aromatization feed 75), to a suitable moisture content. In an aspect, a suitable oxygenate level in one or more streams, such as the aromatization feed 75, the raffinate recycle 90, the mixed feed 402, or the dry hydrogen recycle stream 465, is such that the combination thereof produces a water concentration of less than about 1 part per million on a volume basis (ppmv), alternatively less than about 0.5 ppmv, or alternatively less than about 0.1 ppmv in the untreated recovered hydrogen stream 455. In an aspect, one or more streams fed to the aromatization reactors, aromatization feed 75, the raffinate recycle 90, the mixed feed 402, or the dry hydrogen recycle stream 465, are substantially free of water following drying thereof. In an aspect, the precise amount of the oxygenate and/or the nitrogenate may be added by partially or fully bypassing such treatment processes. Alternatively, the precise amount of the oxygenate and/or the nitrogenate may be added by partially or fully running the recovered hydrogen stream 455 through a wet, e.g., spent, mole sieve bed.

The reformate effluent 45 may comprise $C_6$ arenes. In an aspect, the concentration of $C_6$ arenes in the reformate effluent 45 may be at least 60 wt. %; alternatively, at least 70 wt. %; alternatively, at least 75 wt. %; alternatively, at least 80 wt. %; alternatively, at least 85 wt. %; or alternatively, at least 90 wt. %, based upon a total weight of the reformate effluent 45. In a further aspect, the concentration of $C_6$ arenes in the reformate effluent 45 may be in range of from about 60 wt. % to about 99.9 wt. %; alternatively, from about 70 wt. % to about 99.8 wt. %; alternatively, from about 75 wt. % to about 99.7 wt. %; or alternatively, from about 80 wt. % to about 99.6 wt. %; or alternatively, from about 85 wt. % to about 99.5 wt. %. In a further aspect, the concentration of benzene in the reformate effluent 45 may be at least 85 wt. %; alternatively, at least 87.5 wt. % alternatively, at least 90 wt. %; alternatively, at least 92.5 wt. %; alternatively, at least 95 wt. %; alternatively, at least 97 wt. %; or alternatively, at least 98 wt. %, wherein. In an aspect, the concentration of benzene in the reformate effluent 45 may be in a range of from about 85 wt. % to about 99.9 wt. %; alternatively, about 87.5 wt. % to about 99.9 wt. %; alternatively, about 90 wt. % to about 99.9 wt. %; alternatively, about 92.5 wt. % to about 99.9 wt. %; alternatively, about 95 wt. % to about 99.9 wt. %; alternatively, about 97 wt. % to about 99.9 wt. %; or alternatively, about 98 wt. % to about 99.9 wt. %.

Returning to FIG. 1, the reformate effluent 45 flows into second fractionation process 80, wherein a benzene stream 82, a toluene stream 84, a xylene stream 86, and a raffinate stream 88 are recovered. The benzene stream 82, the toluene stream 84, and the xylene stream 86 may be routed to storage, and/or offered for sale. In an aspect, the xylene stream 86 comprises xylene(s). In a further aspect, the xylene stream 86 further comprises ethylbenzene, e.g., for embodiments in which 1-octene is recovered from the oligomerization reactor effluent 36 and/or the naphtha feed 60 is received in the hydrotreating process 70. In an aspect, the raffinate stream 88 comprises $C_{9+}$ arenes, non-aromatic $C_{9+}$ hydrocarbons, or a combination thereof. In a further aspect, the raffinate stream 88 comprises benzene, toluene, xylene, or combinations thereof. In further aspects, the raffinate stream 88 comprises ethylbenzene, e.g., for embodiments in which 1-octene is recovered from the oligomerization reactor effluent 36 and/or the naphtha feed 60 is received in the hydrotreating process 70. The raffinate stream 88 may be routed to the hydrocarbon recycle 201 of cracking process 200, as disclosed herein, or alternatively, may be routed to storage, and/or offered for sale. In an aspect, a portion of the raffinate stream 88 is optionally routed into a raffinate recycle 90, as disclosed herein. In some aspects, the raffinate recycle 90 flows into aromatization process 400 as disclosed herein.

The skilled artisan will appreciate that second fractionation process 80 may operate in any manner suitable for producing the effluents thereof. For example, second fractionation process 80 may comprise a series of separation units, e.g., flash distillation columns, fractionating distillation columns, liquid-liquid extraction units, etc. Some aspects of second fractionation process 80 may comprise a hydrogen separation process that is substantially similar to hydrogen separation process 450 of FIG. 4. In such aspects, a hydrogen effluent 81 is recovered from second fractionation process 80. The hydrogen effluent 81 may be combined with the hydrogen feed 302 of FIG. 3 as disclosed herein. In a further aspect, the hydrogen effluent 81 may be routed to storage and/or offered for sale.

Figure 5:
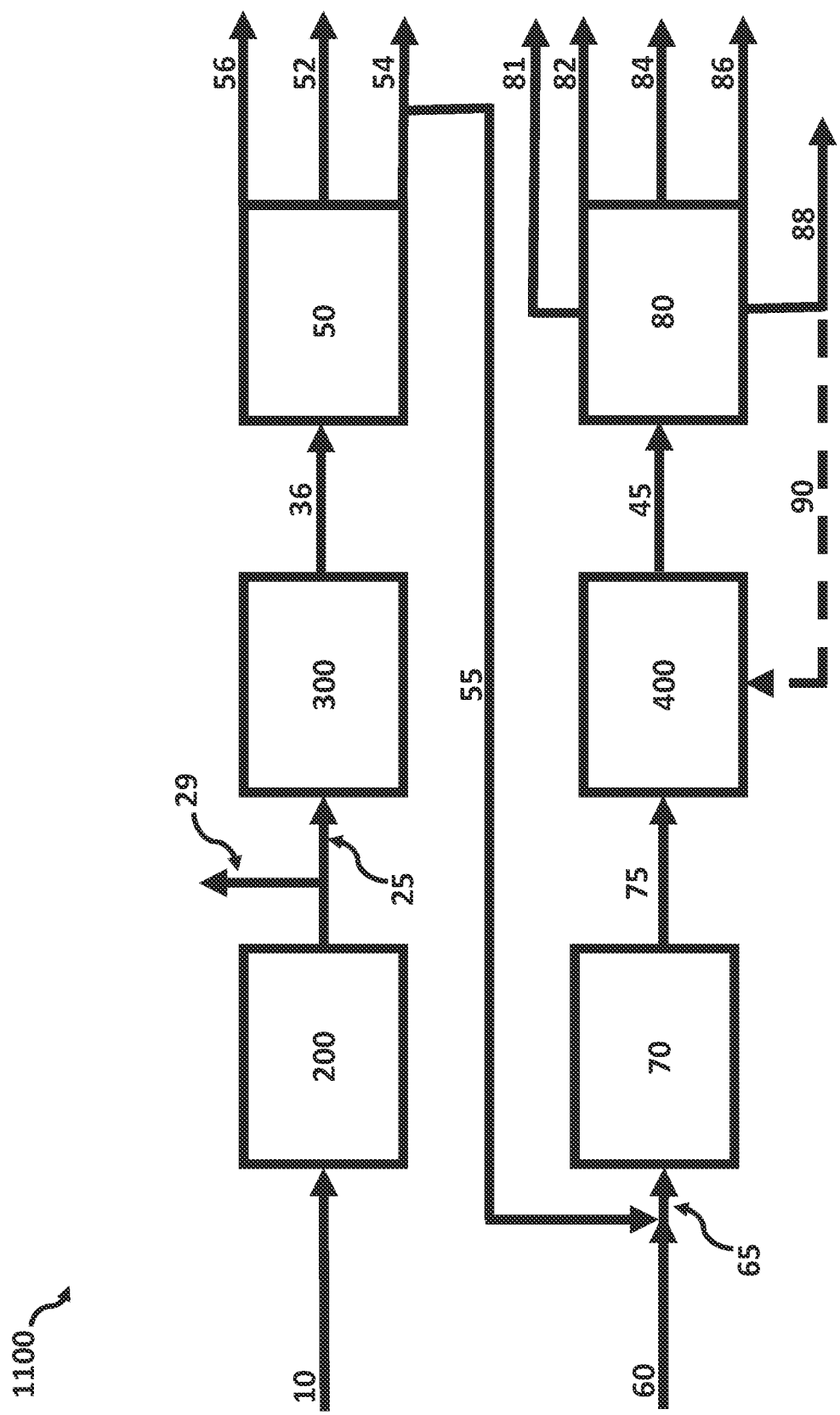
FIG. 5 illustrates a schematic of another integrated converting system.

Referring to FIG. 5, an integrated converting system 1100 is described, wherein like numbers represent like components as described in relation to FIG. 1. In contrast to FIG. 1, a first portion of the octene effluent 54 is used as an octene feed 55. A remaining portion of the octene effluent 54 and the hexene effluent 52 may be routed to storage and/or offered for sale. In an aspect, the octene feed 55 is optionally combined with the naphtha feed 60 to form the treater feed 65 that is routed to aromatization process 400. In aspects where the oligomer products within treater feed 65 comprise octene, the hydrogenation effluent (not shown) produced within hydrotreating process 70 comprises octane. In such aspects, the oligomer products may be contacted with the hydrogenation catalyst in any manner suitable for the formation of octane. Within hydrotreating process 70, the hydrogenation effluent passes through a purification stage, whereby an aromatization feed 75 comprising octane (e.g., n-octane) is recovered.

Figure 6:
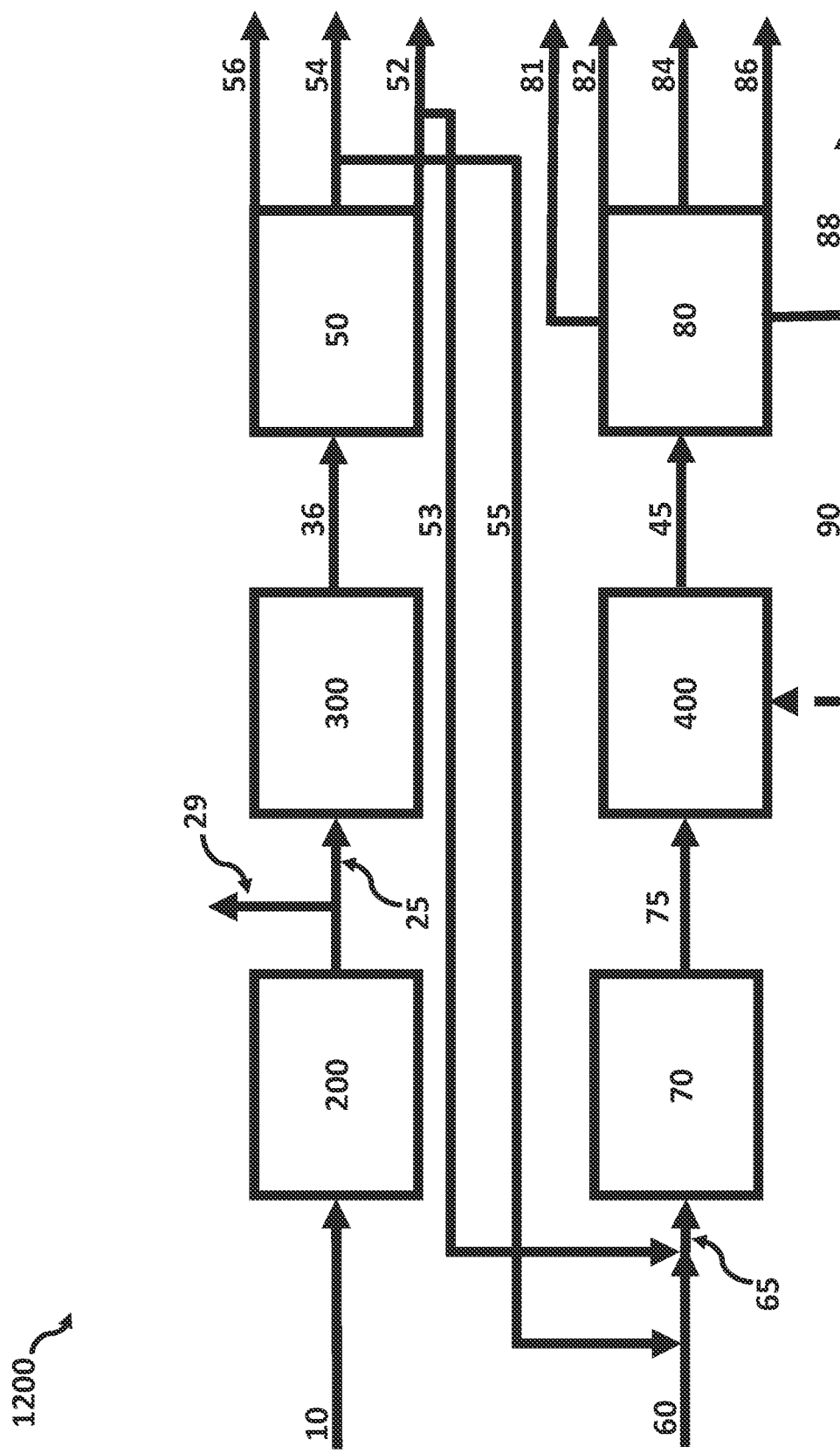
FIG. 6 illustrates a schematic of an additional integrated converting system.

Referring to FIG. 6, an integrated converting system 1200 is described, wherein like numbers represent like components as described in relation to FIG. 1. A first portion of the hexene effluent 52 is used as a hexene feed 53, and a first portion of the octene effluent 54 is used as an octene feed 55. A remaining portion of each of the hexene effluent 52 and the octene effluent 54 may be routed to storage and/or offered for sale. In an aspect, the hexene feed 53 and the octene feed 55 are optionally combined with the naphtha feed 60 to form the treater feed 65 that is routed to hydrotreating process 70. Within hydrotreating process 70, the hydrogenation effluent passes through a purification stage, whereby an aromatization feed 75 comprising hexane (e.g., n-hexane), octane (e.g., n-octane), or a combination thereof is recovered.

Figure 7:
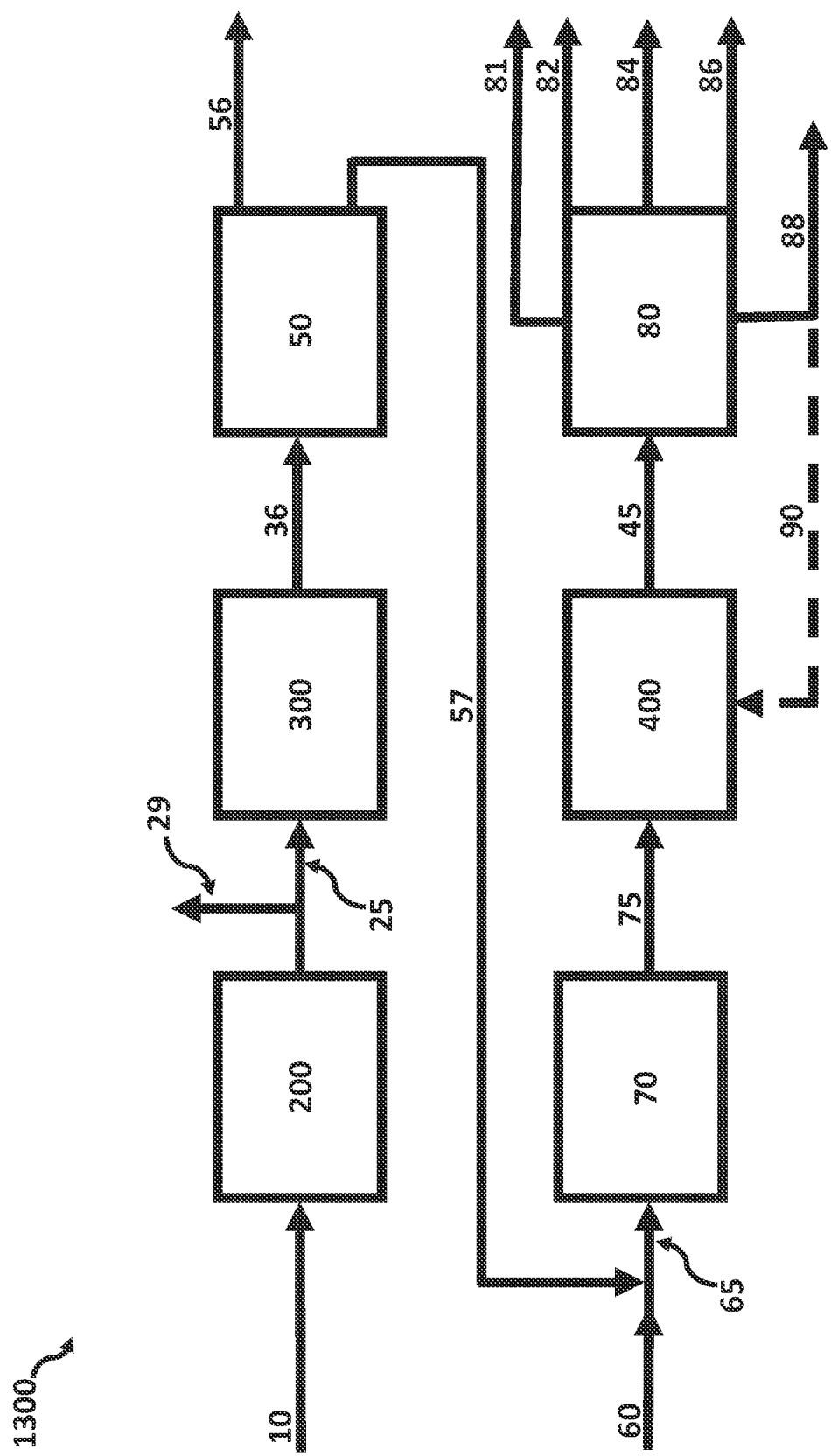
FIG. 7 illustrates a schematic of an integrated converting system.

Referring to FIG. 7, an integrated converting system 1300 is described, wherein like numbers represent like components as described in relation to FIG. 1. A mid-cut feed 57 flows out of the first fractionation process 50 and is optionally combined with the naphtha feed 60 to form the treater feed 65 that is routed to hydrotreating process 70. In an aspect, the mid-cut feed 57 comprises $C_6$ to $C_8$ hydrocarbons. In a further aspect, the mid-cut feed 57 comprises $C_6$ and $C_8$ olefins, wherein the $C_6$ and $C_8$ olefins comprise hexene, octene, or combinations thereof. In a particular aspect, the mid-cut feed 57 comprises 1-hexene and 1-octene.

Figure 8:
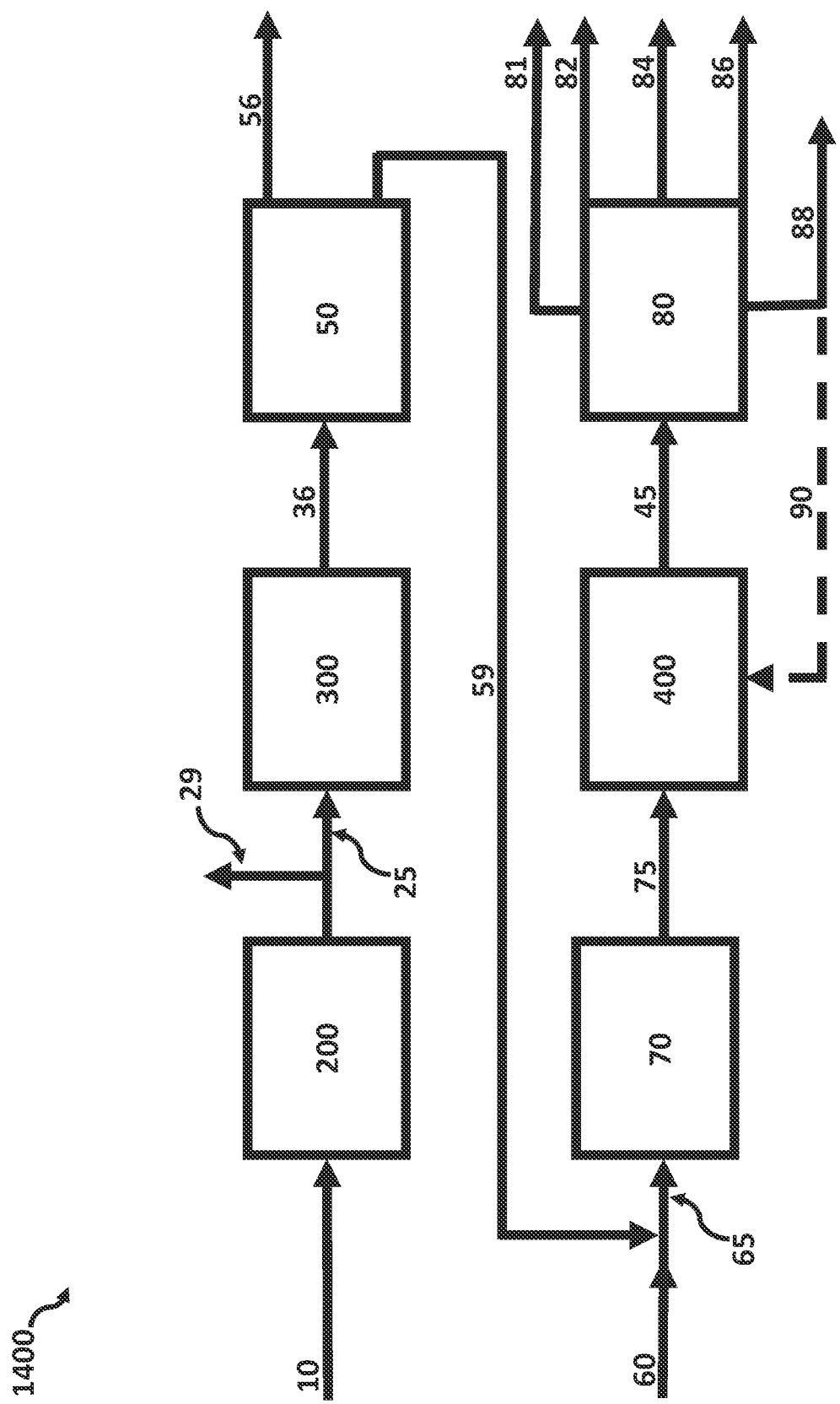
FIG. 8 illustrates a schematic of another integrated converting system.

Referring to FIG. 8, an integrated converting system 1400 is described, wherein like numbers represent like components as described in relation to FIG. 7. A heavy-cut feed 59 flows out of first fractionation process 50 and is optionally combined with the naphtha feed 60 to form the treater feed 65 that is routed to hydrotreating process 70. In an aspect, the heavy-cut feed 59 comprises $C_6$ to $C_{12}$ hydrocarbons. In a further aspect, the heavy-cut feed 59 comprises $C_6$ and $C_{12}$ olefins, wherein the $C_6$ and $C_{12}$ olefins comprise hexene, octene, decene, dodecene, or combinations thereof. In a particular aspect, the heavy-cut feed 59 comprises 1-hexene and 1-octene.

Integrated converting systems 1300 and 1400 are absent hexene effluent 52 and octene effluent 54. Integrated converting systems 1300 and 1400 integrate all of the hexene and octene produced in the oligomerization process 300 into the hydrotreating process 70.

Figure 9:
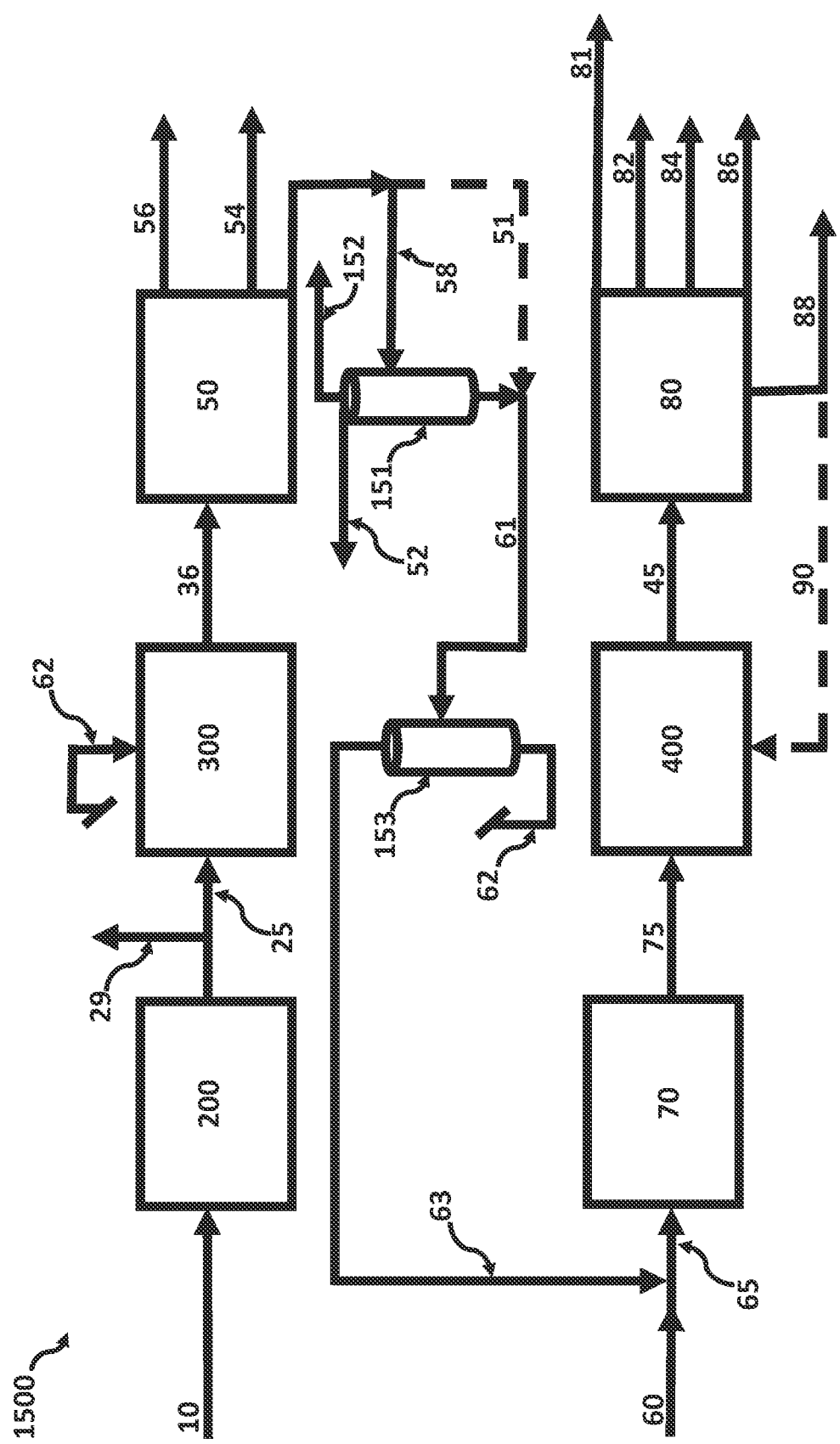
FIG. 9 illustrates a schematic of an additional integrated converting system.

Referring to FIG. 9, an integrated converting system 1500 is described, wherein like numbers represent like components as described in relation to FIG. 1. A cyclohexane recycle 62 flows into oligomerization process 300, wherein cyclohexane functions as a solvent (i.e., diluent). In an aspect, the cyclohexane recycle 62 is combined with the solvent feed 308 of FIG. 3 as disclosed herein. A $C_6$-cut feed 58 flows out of first fractionation process 50 and flows into $C_6$ separator 151. In an aspect, the $C_6$-cut feed 58 comprises $C_6$ hydrocarbons. In $C_6$ separator 151, a hexene effluent 52 and a depleted $C_6$-cut 61 are recovered from the $C_6$-cut feed 58. In an aspect, the composition and disposition of the hexene effluent 52 is the same as disclosed herein for FIG. 1. The depleted $C_6$-cut 61 flows out of $C_6$ separator 151 and flows into cyclohexane recovery (CHR) column 153, wherein a residual $C_6$ feed 63 and the cyclohexane recycle 62 are recovered from the depleted $C_6$-cut 61. The residual $C_6$ feed 63 is optionally combined with a naphtha feed 60 to form a treater feed 65 that is routed to aromatization process 400. In an aspect, the residual $C_6$ feed 63 comprises $C_6$ hydrocarbons (e.g., hexanes). $C_6$ separator 151 and CHR column 153 may operate in any manner suitable for producing the effluents thereof. In an aspect, each of $C_6$ separator 151 and CHR column 153 comprise at least one fractionator.

As disclosed herein, the entirety of the $C_6$-cut feed 58 enters $C_6$ separator 151. Such a configuration of integrated converting system 1500 advantageously generates the hexene effluent 52 at full capacity. Some aspects of integrated converting system 1500 are configured to operate in the absence of $C_6$ separator 151, wherein no hexene effluent 52 is generated. In such aspects, an optional bypass line 51 routes the entirety of the $C_6$-cut feed 58 into CHR column 153, wherein the $C_6$-cut feed 58 enters CHR column 153 through line 61. Such configuration of integrated converting system 1500 may be utilized when, for example, the demand for C$_6$ olefins (e.g., 1-hexene), is low, and/or when the supply of sources for the naphtha feed 60 is low, or alternatively to avoid costs associated with sources for the naphtha feed 60. In a further aspect, the flow of the C$_6$-cut feed 58 is split between C$_6$ separator 151 and CHR column 153 through metering the flow of the optional bypass line 51.

In an aspect, the flexible configuration of integrated converting system 1500 beneficially allows an operator to rapidly respond to, for example, commercial (market), weather, and/or production factors.

Figure 10:
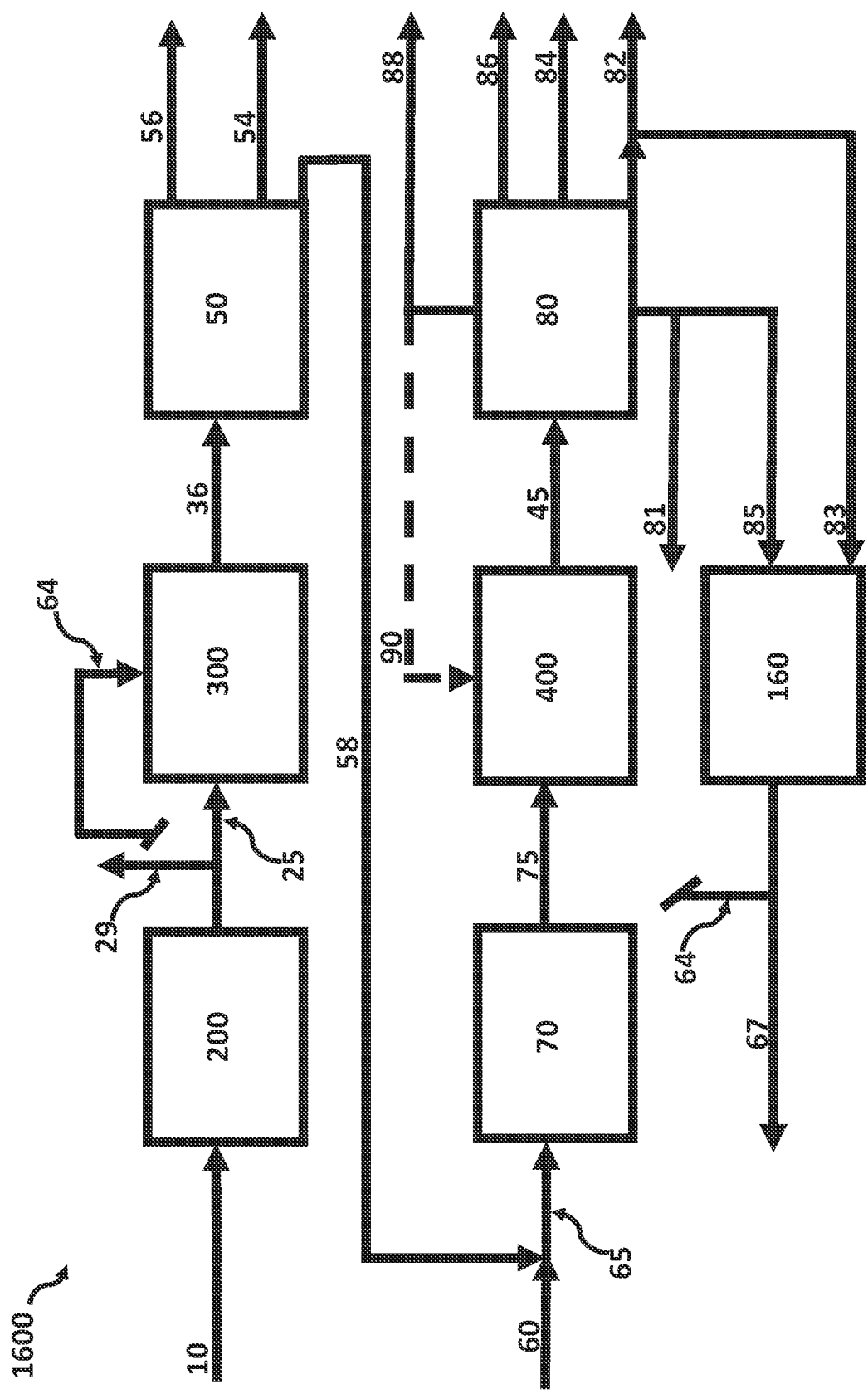
FIG. 10 illustrates a schematic of an integrated converting system.

Referring to FIG. 10, an integrated converting system 1500 is described, wherein like numbers represent like components as described in relation to FIG. 9. A cyclohexane feed 64 flows into oligomerization process 300, wherein cyclohexane functions as a solvent (i.e., diluent). In an aspect, the cyclohexane feed 64 is combined with the solvent feed 308 of FIG. 3 as disclosed herein. The C$_6$-cut feed 58 flows out of first fractionation process 50 and is optionally combined with a naphtha feed 60 to form a treater feed 65 that is routed to hydrotreating process 70. Referring to second fractionation process 80, a portion of the benzene stream 82 is routed through the benzene feed 83, and a portion of the hydrogen effluent 81 is routed through a reducing feed 85. The benzene feed 83 and the reducing feed 85 flow into benzene hydrogenation process 160, wherein hydrogenation of benzene produces a cyclohexane effluent 67. In an aspect, the cyclohexane effluent 67 comprises cyclohexane and may be routed for storage or for sale. A portion of the cyclohexane effluent 67 may be routed to the cyclohexane feed 64 as disclosed herein. Hydrogenation of benzene may be performed by any means suitable as determined by one having ordinary skill in the art and with the aid of this disclosure. For example, in non-limiting aspects a hydrogenation catalyst can be utilized. Operating conditions within hydrogenation process 160 may be any combination of conditions suitable as determined by one having ordinary skill in the art and with the aid of this disclosure. In an aspect, the temperature and pressure within hydrogenation process 160 may be at levels capable to hydrogenate benzene. The temperature within hydrogenation process 160 may be in a range of from about 10° C. to about 205° C. The pressure within hydrogenation process 160 may be in a range of from about 360 psig to about 615 psig (about 2.48 MPag to about 4.24 MPag).

In an aspect, the concentration of cyclohexane in the cyclohexane effluent 67 may be at least 85 wt. %; alternatively, at least 87.5 wt. % alternatively, at least 90 wt. %; alternatively, at least 92.5 wt. %; alternatively, at least 95 wt. %; alternatively, at least 97 wt. %; or alternatively, at least 98 wt. %, based upon a total weight of the cyclohexane effluent 67. In further aspects, the concentration of cyclohexane in the cyclohexane effluent 67 may be in a range of from about 85 wt. % to about 99.9 wt. %; alternatively, about 87.5 wt. % to about 99.9 wt. %; alternatively, about 90 wt. % to about 99.9 wt. %; alternatively, about 92.5 wt. % to about 99.9 wt. %; alternatively, about 95 wt. % to about 99.9 wt. %; alternatively, about 97 wt. % to about 99.9 wt. %; or alternatively, about 98 wt. % to about 99.9 wt. %.

Figure 11:
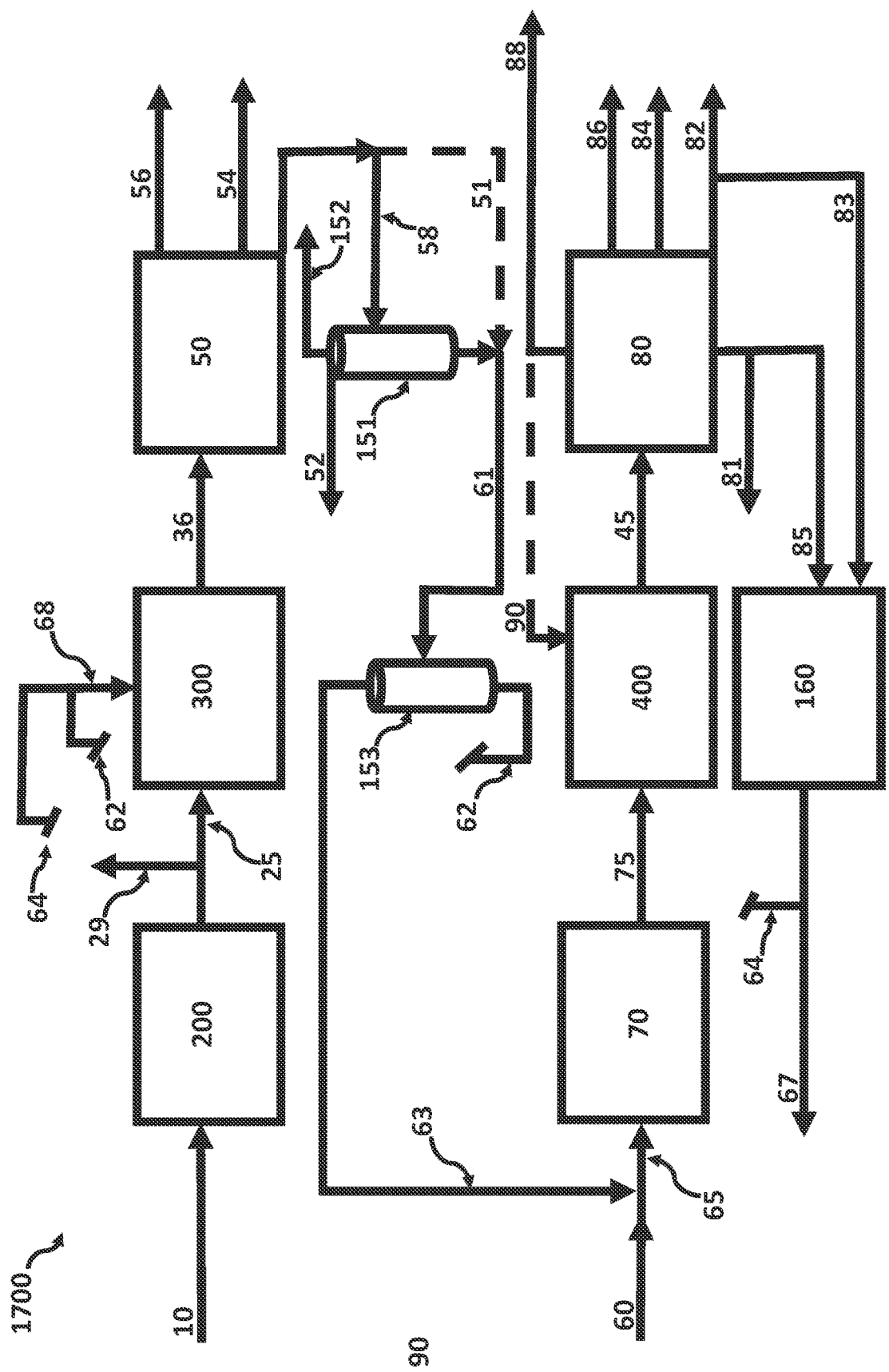
FIG. 11 illustrates a schematic of another integrated converting system.

Referring to FIG. 11, an integrated converting system 1700 is described, wherein like numbers represent like components as described in relation to FIG. 9 and FIG. 10. A second solvent recycle 68 flows into oligomerization process 300, wherein cyclohexane functions as a solvent (i.e., diluent). In an aspect, the second solvent recycle 68 is combined with the solvent feed 308 of FIG. 3 as disclosed herein. The second solvent recycle 68 can be formed by the combination of the cyclohexane recycle 62 and the cyclohexane feed 64 as described herein.

Figure 12:
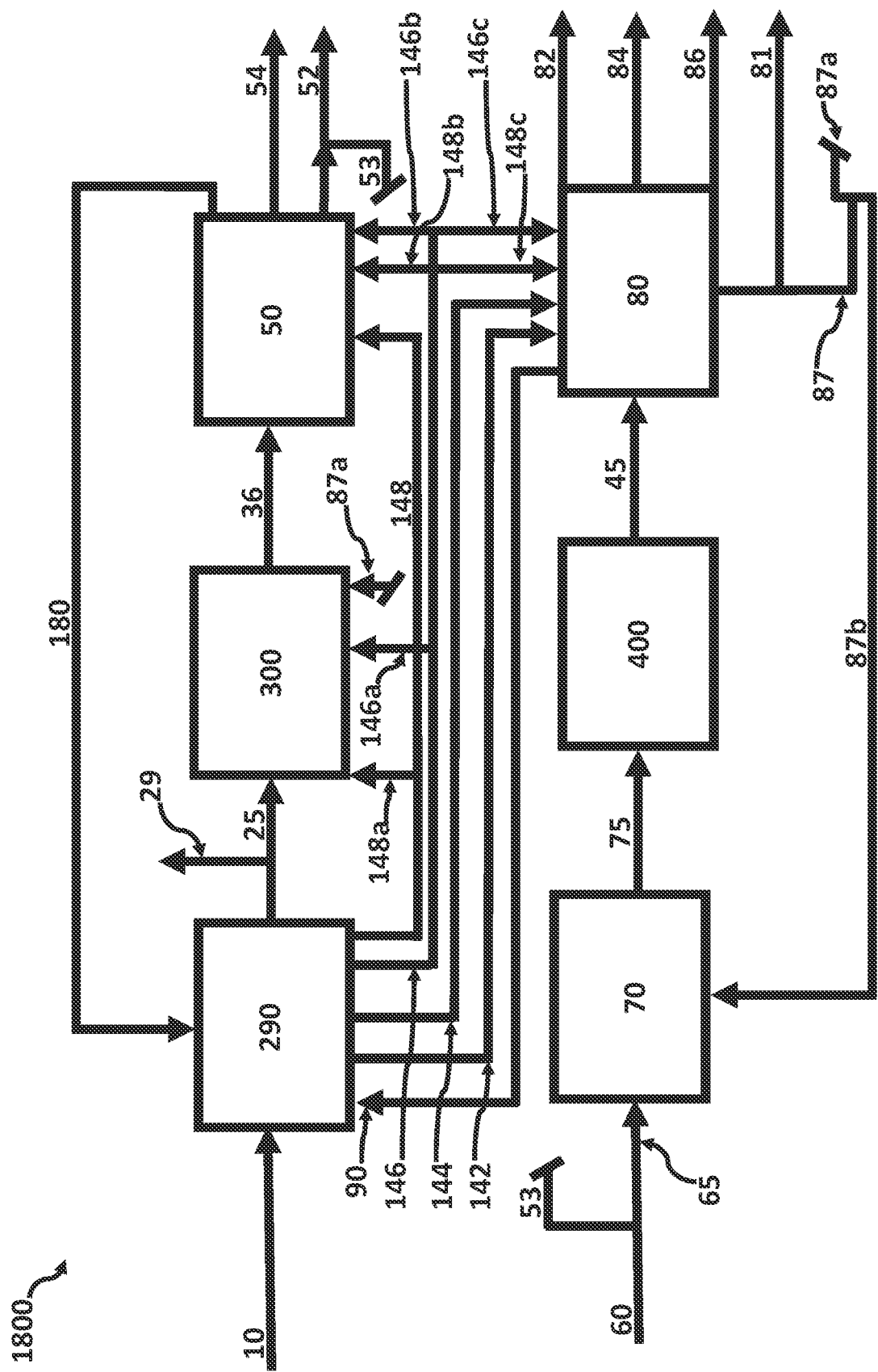
FIG. 12 illustrates a schematic of an additional integrated converting system.

Referring to FIG. 12, an integrated converting system 1800 is described, wherein like numbers represent like components as described in relation to FIG. 1. In contrast to FIG. 1, the hydrocarbon feedstock 10 flows into cracking process 290, which operates in a manner similar to that of cracking process 200 of FIG. 2, unless otherwise explicitly disclosed. The raffinate recycle 90 flows from second fractionation process 80 as previously disclosed herein, and a heavies recycle 180 flows into cracking process 290. In an aspect, the raffinate recycle 90 and the heavies recycle 180 are combined with the hydrocarbon recycle 201 of FIG. 2. The heavies recycle 180 can be obtained from the first fractionation process 50. The heavies recycle 180 may comprise heavy hydrocarbons including C$_{9+}$ hydrocarbons, C$_{9+}$ oligomers formed by the oligomerization reaction, polymeric products formed by the oligomerization reaction, or combinations thereof. In an aspect, the C$_{9+}$ oligomers comprise decenes, dodecenes, tetradecenes, and combinations thereof.

Flowing out of cracking process 290 are the cracking process effluent 25 as previously disclosed herein, a refrigerant stream 146, a crude pyrolysis gasoline (CPG) stream 142, a fuel gas stream 144, and a steam effluent 148. The refrigerant stream 146 may be recovered from the cracker effluent 210, the C$_{3+}$ stream 262, and/or the alternate C$_{3+}$ stream 282 of FIG. 2. In an aspect, the refrigerant stream 146 comprises light hydrocarbons produced with cracking process 290, wherein the light hydrocarbons comprise methane, ethane, ethylene, propane, propylene, butane, as well as combinations thereof. Three portions 146a, 146b, and 146c of the refrigerant stream 146 may be routed to oligomerization process 300 and/or aromatization process 400, wherein they are used for cooling and/or refrigeration therein (e.g., in an overhead condenser of a fractionation column of the first fractionation process 50). The steam effluent 148 comprises steam recovered from cracking process 290 (e.g., cracking zone 205), of FIG. 2. Three portions 148a, 148b, and 148c of the steam effluent 148 may be routed to oligomerization process 300, first fractionation process 50, and/or second fractionation process 80, any of which may be utilized therein as a heat source, e.g., as a heat source for one or more fractionation column reboilers. The CPG stream 142 and the fuel gas stream 144 flow into second fractionation process 80. A portion of the hydrogen effluent 81 is routed into a hydrogen efflux 87. A first portion 87a of the hydrogen efflux 87 flows into oligomerization process 300, wherein it is combined with the hydrogen feed 302 of FIG. 3. A second portion 87b of the hydrogen efflux 87 flows into hydrotreating process 70.

In an aspect, utilization of the refrigerant stream 146 and/or the steam effluent 148 provides a portion of the utility needs (e.g., heating and cooling) of integrated converting system 1800, and advantageously reduces the associated operating cost(s).

Figure 13:
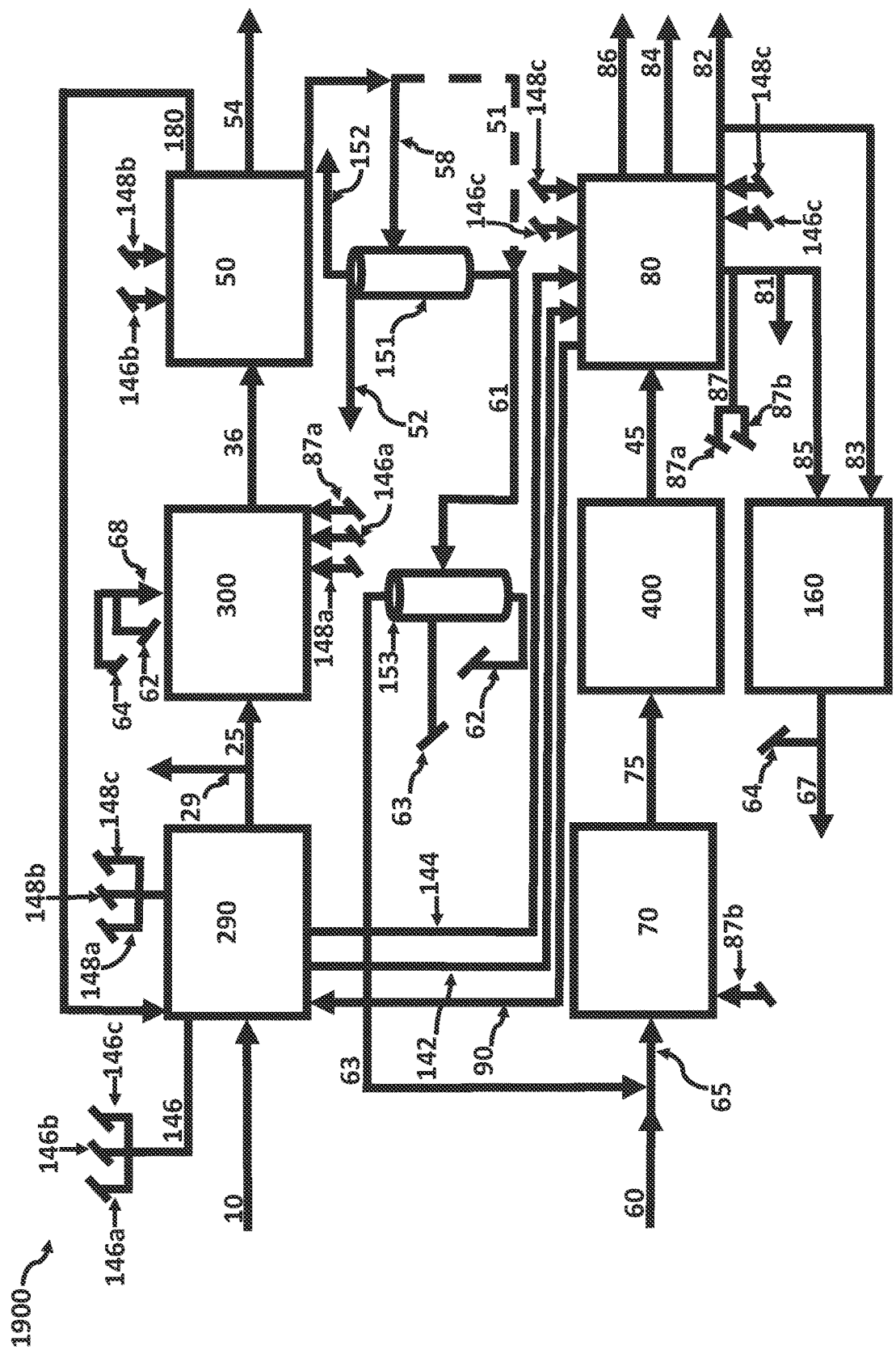
FIG. 13 illustrates a schematic of an integrated converting system.

Referring to FIG. 13, an integrated converting system 1900 is described, wherein like numbers represent like components as described in relation to FIGS. 11 and 12. System 1900 features the flexible configuration of integrated converting system 1500 and a portion of the integrated utility of integrated converting system 1800.

Disclosed herein is a method of enriching a motor fuel stream (i.e., mogas). In an aspect, the mogas comprises the fuel gas stream 144 of integrated converting system 1800 or integrated converting system 1900. In a further aspect, the mogas is an enriched motor fuel. In a particular aspect, the mogas is enriched by blending in one or more of the effluent streams generated by an integrated converting system of the present disclosure. For example, the heavies effluent 56, the raffinate stream 88, or a combination thereof may be blended into the mogas.

Described herein is a limited set of operating conditions (e.g., temperature, pressure) for the processes and systems of the present disclosure. One having ordinary skill in the art will appreciate that any operating conditions which are not presently disclosed may have any value or, alternatively, range of values, suitable for operation of the processes and systems as disclosed herein. In a further aspect, changes to operating conditions within any of the processes and systems disclosed herein may be implemented by one having ordinary skill in the art with the aid of the present disclosure to maintain operation of the processes and systems disclosed.

In an aspect, producing benzene with an integrated converting system of the present disclosure can be advantageous in one or more areas when compared to conventional methods of benzene production that utilize non-integrated (i.e., stand-alone) converting processes. Conventional methods of benzene production utilize materials contained in crude oil (e.g., materials accessed via the cracking of naphtha) such that the cost of benzene production is linked to crude oil. The present disclosure utilizes ethane contained in natural gas as a starting material (e.g., ethane produced via steam cracking of ethane) such that the cost of benzene production is advantageously decoupled from crude oil. As increasing quantities of natural gas become available, the price of natural gas is decreasing while other factors are increasing demand for benzene. For example, in North America an abundance of ethane for steam cracking has made naphtha cracking uneconomical. There also appears to be the possibility of a potentially significant oversupply of ethylene in the future. A further advantage is that ethylene can be converted into benzene with an integrated converting system of the present disclosure to best accord with relevant financial and/or market conditions, particularly in view of the significant global price increase associated with benzene (see, for example, https://www.statista.com/statistics/1171072/price-benzene-forecast-globally/).

A further advantage of an integrated converting system of the present disclosure is the ability to produce large quantities of ethylene, 1-hexene, 1-octene, and benzene, and to subsequently sell portions of each compound in accordance with relevant global demand. An integrated converting system in accordance with the present disclosure features flexible modification of the rates of production of the product streams to accommodate changes in demand and/or price(s) of 1-hexene, 1-octene, and/or benzene. In some aspects, as much as 1.5 million tons of ethylene could be produced annually. Other products that can be generated for sale by utilizing an integrated converting system of the present disclosure include hydrogen (i.e., hydrogen effluent 81), cyclohexane (i.e., cyclohexane effluent 67), and toluene (i.e., toluene stream 84).

A further advantage of an integrated converting system of the present disclosure is that 1-hexene may potentially be used as a feed for the aromatization process. Hydrogenation of 1-hexene to n-hexane as disclosed herein might provide further production advantages, including slower catalyst deactivation, fewer plant turnarounds, and greater aromatics selectivity. Because the cracking feedstock is derived from natural gas, plastic or polymeric waste, biomass, other natural sources, etc., instead of crude oil, the 1-hexene/n-hexane being fed to the aromatization process would have a low sulfur content, potentially allowing for the removal, recycle, conversion, etc., of traditional staged combustion air pretreaters and the subsequent lowering of capital cost.

A further advantage of an integrated converting system of the present disclosure is through the use of light hydrocarbons produced with cracking process 200 as a cooling and/or refrigeration source in oligomerization process 300. This approach would allow removal of dedicated refrigeration units within oligomerization process 300 and provide a subsequent lowering of capital cost. A further advantage is that cracking process 200 may produce hydrogen and methane (not shown) which can be used as fuel for heating and/or operating other process within the integrated converting system. This may allow for beneficial design improvements to a plant or system, such as the downsizing of heat exchangers.

EXAMPLES

The subject matter having been generally described, the following examples are given as particular aspects of the disclosure and to demonstrate the practice and advantages thereof. It is understood that the examples are given by way of illustration and are not intended to limit the specification of the claims to follow in any manner. It is to be clearly understood that resort can be had to various other aspects, modifications, and equivalents thereof which, after reading the description herein, can be suggestive to one of ordinary skill in the art without departing from the spirit of the present disclosure or the scope of the appended claims.

Figure 14:
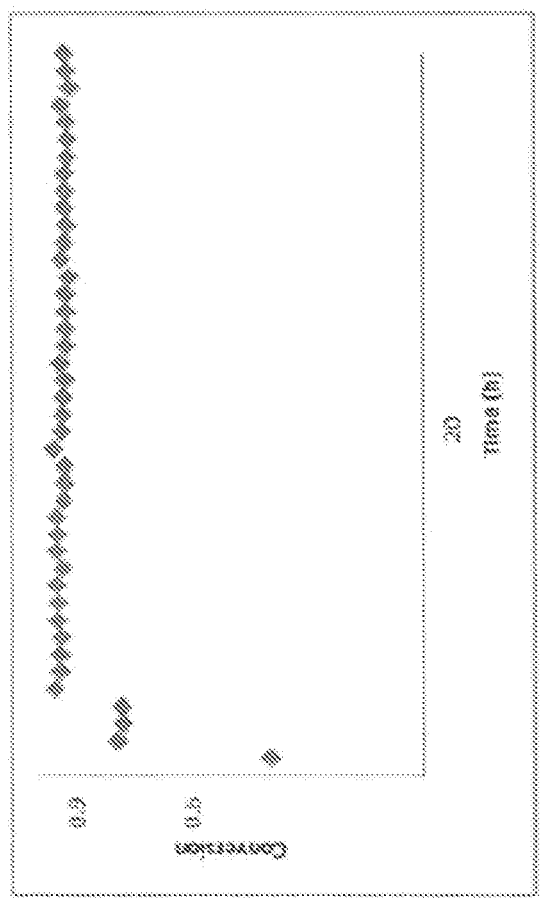
FIG. 14 displays a graph of conversion for converting 1-hexene to benzene.
Figure 15:
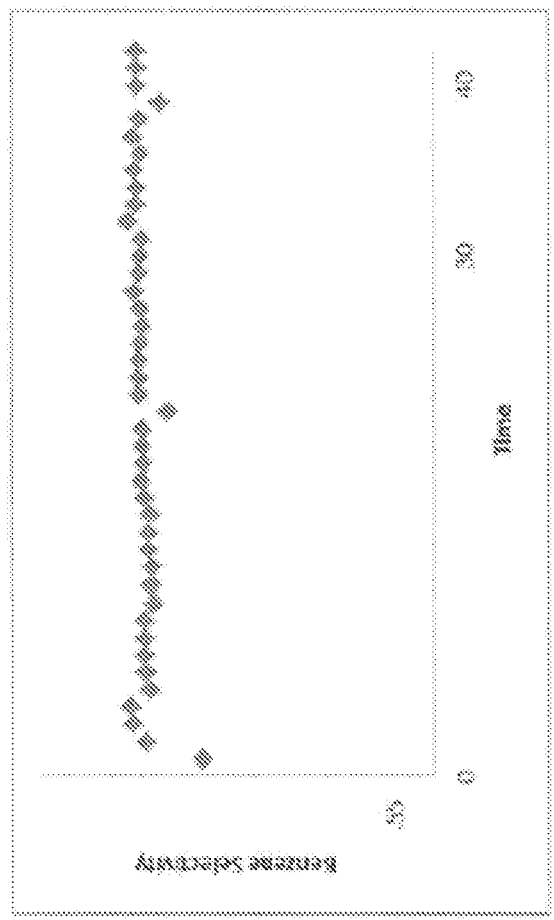
FIG. 15 displays a graph of selectivity for converting 1-hexene to benzene.

FIGS. 14 and 15 display results for utilization of an Aromax® catalyst to produce benzene from 1-hexene. Operating conditions were at a constant temperature of 950° F. (510° C.), a liquid hourly space velocity of 12 $h^{-1}$, a pressure of 100 psig (0.68 MPag), and a molar ratio of hydrogen to hydrocarbons of 1.2:1. FIG. 14 shows that under the conditions specified conversion for 1-hexene to benzene approaches nearly 100% at around 5 hours. FIG. 15 shows that under the conditions specified, the selectivity for converting 1-hexene to benzene remains at about 85% at around 5 hours. After about 1 hour, the benzene selectivity at the above conditions is approximately 80%.

The scope of protection of the present disclosure is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the detailed description of the present disclosure. The disclosures of all patents, patent applications, and publications cited herein are hereby incorporated by reference.

Aspects of methods for treater regeneration have been described. The following are a first set of non-limiting, specific embodiments in accordance with the present disclosure:

While several aspects and embodiments of the present disclosure have been shown and described, modifications thereof can be made by one skilled in the art without departing from the spirit and teachings of the present disclosure. The aspects, embodiments, and examples described herein are exemplary only, and are not intended to be limiting. Many variations and modifications of the present disclosure are possible and are within the scope of the subject matter.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while systems, processes, and methods are often described in terms of "comprising" various components, devices, or steps, the systems, processes, and methods can also "consist essentially of" or "consist of" the various components, devices, or steps, unless stated otherwise.

The term "about" as used herein means that amounts, sizes, formulations, parameters, and other quantities and characteristics are not and need not be exact, but may be approximate and/or larger or smaller, as desired, reflecting tolerances, conversion factors, rounding off, measurement errors and the like, and other factors known to those of skill in the art. In general, an amount, size, formulation, parameter or other quantity or characteristic is "about" or "approximate" whether or not it is expressly stated to be such. The term "about" also encompasses amounts that differ due to varying equilibrium conditions for a composition resulting from a particular initial mixture. Whether or not modified by the term "about," the claims include equivalents to the quantities. The term "about" may mean within 10% of the reported numerical value, alternatively within 5% of the reported numerical value.

Unless indicated otherwise, when a range of any type is disclosed or claimed, for example a range of the number of carbon atoms, molar ratios, temperatures, and the like, it is intended to disclose or claim individually each possible number that such a range could reasonably encompass, including any sub-ranges encompassed therein. For example, when describing a range of the number of carbon atoms, each possible individual integral number and ranges between integral numbers of atoms that the range includes are encompassed therein. Thus, by disclosing a $C_1$ to $C_{10}$ alkyl group or an alkyl group having from 1 to 10 carbon atoms or "up to" 10 carbon atoms, Applicants' intent is to recite that the alkyl group can have 1, 2, 3, 4, 5, 6, 7, 8, 9, or 10 carbon atoms, and these methods of describing such a group are interchangeable. When describing a range of measurements such as molar ratios, every possible number that such a range could reasonably encompass can, for example, refer to values within the range with one significant digit more than is present in the end points of a range. In this example, a molar ratio between 1.03:1 and 1.12:1 includes individually molar ratios of 1.03:1, 1.04:1, 1.05:1, 1.06:1, 1.07:1, 1.08:1, 1.09:1, 1.10:1, 1.11:1, and 1.12:1. Applicants' intent is that these two methods of describing the range are interchangeable. Moreover, when a range of values is disclosed or claimed, which Applicant's intent to reflect individually each possible number that such a range could reasonably encompass, Applicants also intend for the disclosure of a range to reflect, and be interchangeable with, disclosing any and all sub-ranges and combinations of sub-ranges encompassed therein. In this aspect, Applicants' disclosure of a $C_1$ to $C_{10}$ alkyl group is intended to literally encompass a $C_1$ to $C_6$ alkyl, a $C_4$ to $C_8$ alkyl, a $C_2$ to $C_7$ alkyl, a combination of a $C_1$ to $C_3$ and a $C_5$ to $C_7$ alkyl, and so forth. When describing a range in which the end points of the range have different numbers of significant digits, for example, a molar ratio from 1:1 to 1.2:1, every possible number that such a range could reasonably encompass can, for example, refer to values within the range with one significant digit more than is present in the end point of a range having the greatest number of significant digits, in this case 1.2:1. In this example, a molar ratio from 1:1 to 1.2:1 includes individually molar ratios of 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, and 1.20, all relative to 1, and any and all sub-ranges and combinations of sub-ranges encompassed therein. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Unless otherwise specified, the terms contacted, combined, and "in the presence of" refer to any addition sequence, order, or concentration for contacting or combining two or more components of any process disclosed herein. The combining or contacting of the components, according to the various methods described herein, can occur in one or more contact zones under suitable contact conditions such as temperature, pressure, contact time, etc. The contact zone can be disposed in a vessel (e.g., a storage tank, tote, container, mixing vessel, reactor, etc.), a length of pipe (e.g., a tee, inlet, injection port, or header for combining component feed lines into a common line), or any other suitable apparatus for bringing the components into contact.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior disclosure.

In any application before the United States Patent and Trademark Office, the Abstract of this application is provided for the purpose of satisfying the requirements of 37 C.F.R. § 1.72 and the purpose stated in 37 C.F.R. § 1.72(b)

"to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+R_k \cdot (R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim.

ADDITIONAL DISCLOSURE

The following enumerated embodiments of the present disclosures are provided as nonlimiting examples.

A first embodiment which is a method comprising: contacting, in an oligomerization process, ethylene with a selective-higher-olefin catalyst to yield an oligomerization reactor effluent comprising $C_6$ hydrocarbons which include 1-hexene and $C_8$ hydrocarbons which include 1-octene; recovering 1-hexene and 1-octene from the oligomerization reactor effluent; contacting, in a hydrotreating process, 1-hexene, 1-octene, or both 1-hexene and 1-octene recovered from the oligomerization reactor effluent with a hydrogenation catalyst to yield an aromatization feed comprising hexane, octane, or both; and contacting, in an aromatization process, the aromatization feed with an aromatization catalyst to yield reformate effluent comprising benzene.

A second embodiment which is the method of the first embodiment, wherein the $C_6$ hydrocarbons are present in an amount of about 20 wt. % to about 99 wt. % based on a total weight of the oligomerization reactor effluent, and the $C_8$ hydrocarbons are present in an amount of about 0.1 wt. % to about 75 wt. % based on a total weight of the oligomerization reactor effluent.

A third embodiment which is the method of the first or second embodiment, wherein a purity of 1-hexene is about 60 wt. % to about 99.9 wt. % based on a total weight of the $C_6$ hydrocarbons in the oligomerization reactor effluent.

A fourth embodiment which is the method of any of the first to third embodiments, wherein a purity of 1-octene is about 95 wt. % to about 99.3 wt. % based on a total weight of the $C_8$ hydrocarbons in the oligomerization reactor effluent.

A fifth embodiment which is the method of any of the first to fourth embodiments, wherein the oligomerization reactor effluent further comprises $C_{10}$ hydrocarbons, $C_{12}$ hydrocarbons, $C_{14+}$ hydrocarbons, or a combination thereof.

A sixth embodiment which is the method of the fifth embodiment, wherein the $C_{10}$ hydrocarbons are present in an amount of about 1 wt. % to about 4 wt. % based on a total weight of the oligomerization reactor effluent, the $C_{12}$ hydrocarbons are present in an amount of about 0.1 wt. % to about 3 wt. % based on the total weight of the oligomerization reactor effluent, and the $C_{14+}$ hydrocarbons are present in an amount of about 0 wt. % to about 3.5 wt. % based on the total weight of the oligomerization reactor effluent.

A seventh embodiment which is the method of any of the first to sixth embodiments, wherein the selective-higher-olefin catalyst is selected from PN Mes-tBuPh-DIP, PN Mes-MeOPh-DIP, PN Xyl-Bz-DnB, PN Xyl-Bz-DPh, PN Guan-DIP, PN Mes-Ph-DIP, PN Xyl-Ph-DEt, PNP DPh-Hex-DPh, PNP DPh-Cy-DPh, PNP DPh-iPR-DPh2-OMe, PNP DPh-1MeiPR-DPh, or a combination thereof, and wherein the aromatization catalyst comprises a zeolite support, a group VIII metal, and one or more halides.

An eighth embodiment which is the method of any of the first to seventh embodiments, wherein the step of contacting ethylene with a selective-higher-olefin catalyst is performed in the presence of a diluent selected from isobutane, cyclohexane, methylcyclohexane, isobutene, 1-hexene, or a combination thereof.

A ninth embodiment which is the method of any of the first to eighth embodiments, wherein recovering 1-hexene and 1-octene from the oligomerization reactor effluent comprises: fractionating the oligomerization reactor effluent into a first stream comprising heavy hydrocarbons and spent catalyst, a second stream comprising octenes, and a third stream comprising hexenes, wherein, of the first stream, the second stream, and the third stream, only a portion of the third stream is fed to the hydrotreating process.

A tenth embodiment which is the method of any of the first to eighth embodiments, wherein recovering 1-hexene and 1-octene from the oligomerization reactor effluent comprises: fractionating the oligomerization reactor effluent into a first stream comprising heavy hydrocarbons and spent catalyst, a second stream comprising octenes, and a third stream comprising hexenes, wherein, of the first stream, the second stream, and the third stream, only a portion of the second stream and only a portion of the third stream are fed to the hydrotreating process.

An eleventh embodiment which is the method of any of the first to eighth embodiments, wherein recovering 1-hexene and 1-octene from the oligomerization reactor effluent comprises: fractionating the oligomerization reactor effluent into a first stream comprising heavy hydrocarbons and spent catalyst and a second stream comprising hexenes and octenes, wherein, of the first stream and the second stream, only a portion of the second stream is fed to the hydrotreating process.

A twelfth embodiment which is the method of any of the first to eighth embodiments, wherein recovering 1-hexene and 1-octene from the oligomerization reactor effluent comprises: fractionating the oligomerization reactor effluent into a first stream comprising spent catalyst and a second stream comprising hexenes, octenes, and heavy hydrocarbons, wherein, of the first stream and the second stream, only a portion of the second stream is fed to the hydrotreating process.

A thirteenth embodiment which is the method of any of the first to eighth embodiments, wherein recovering 1-hexene and 1-octene from the oligomerization reactor effluent comprises: separating the oligomerization reactor effluent into a first stream comprising heavy hydrocarbons and spent catalyst, a second stream comprising octenes, and a third stream comprising hexenes; fractionating the third stream to yield a high purity 1-hexene stream and a $C_6$ feed stream; and flowing the $C_6$ feed stream to the hydrotreating process.

A fourteenth embodiment which is the method of any of the first to thirteenth embodiments, further comprising: fractionating a refinery stream to recover a naphtha stream; feeding the naphtha stream to the hydrotreating process; and contacting, in the hydrotreating process, naphtha with the hydrogenation catalyst to yield one or more of n-hexane and n-octane in the aromatization feed.

A fifteenth embodiment which is the method of any of the first to fourteenth embodiments, wherein the reformate effluent further comprises toluene, ethylbenzene, xylene, 1-hexene, 1-octene, or a combination thereof, the method further comprising: fractionating the reformate effluent into a benzene stream, a toluene stream, a xylene stream, and a raffinate stream.

A sixteenth embodiment which is the method of the fifteenth embodiment, wherein the 1-hexene is present in the benzene stream, the toluene stream, or both the benzene stream and the toluene stream.

A seventeenth embodiment which is the method of the fifteenth embodiment, wherein the 1-octene is present in the xylene stream, the raffinate stream, or both the xylene stream and the raffinate stream.

An eighteenth embodiment which is the method of any of the first to seventeenth embodiments, wherein the aromatization process is further configured to produce a hydrogen effluent, the method further comprising: flowing a portion of the benzene stream and a portion of the hydrogen effluent to a hydrogenation process to yield cyclohexane; and recycling the cyclohexane to the oligomerization process.

A nineteenth embodiment which is the method of any of the first to eighteenth embodiments, wherein the oligomerization reactor effluent further comprises cyclohexane and other hexanes, the method further comprising: recovering cyclohexane and the other hexanes from the oligomerization reactor effluent; flowing the other hexanes recovered from the oligomerization reactor effluent to the hydrotreating process; and recycling cyclohexane recovered from the oligomerization reactor effluent to the oligomerization process.

A twentieth embodiment which is the method of any of the first to nineteenth embodiments, further comprising: cracking ethane, propane, butane, pentane, naphtha, or mixtures thereof in a steam cracker to yield a cracker effluent comprising ethylene; and flowing ethylene recovered from the cracker effluent to the oligomerization process.

A twenty-first embodiment which is the method of the twentieth embodiment, wherein the cracker effluent further comprises light hydrocarbons, the method further comprising: using light hydrocarbons recovered from the cracker effluent as a cooling source for an oligomerization reactor in the oligomerization process, for a first fractionation process located downstream of the oligomerization process, for a second fractionation process located downstream of the aromatization process, or a combination thereof.

A twenty-second embodiment which is the method of any of the first to twenty-first embodiments, further comprising: recovering steam from the steam cracker; and using steam as a heating source for the oligomerization process, for a first fractionation process located downstream of the oligomerization process, for a second fractionation process located downstream of the aromatization process, or a combination thereof.

A twenty-third embodiment which is the method of any of the first to twenty-second embodiments, wherein the step of contacting ethylene and a selective-higher-olefin catalyst is performed in the presence of a diluent recovered from the reformate effluent, wherein the diluent is selected from a raffinate, benzene, toluene, xylene, branched alkanes, or combinations thereof.

A twenty-fourth embodiment which is the method of any of the first to twenty-third embodiments, further comprising: flowing a raffinate recovered from the aromatization process to a steam cracker; and cracking the raffinate in the steam cracker.

A twenty-fifth embodiment which is the method of any of the first to twenty-fourth embodiments, wherein the oligomerization reactor effluent further comprises $C_{9+}$ hydrocarbons, the method further comprising: blending the $C_{9+}$ hydrocarbons, a raffinate stream obtained from the reformate effluent, or both the $C_{9+}$ hydrocarbons and the raffinate stream into a motor fuel stream.

A twenty-sixth embodiment which is the method of any of the first to twenty-fifth embodiments, further comprising: flowing hydrogen obtained from the reformate effluent to the oligomerization process, the hydrotreating process, or both the oligomerization process and the hydrotreating process.

A twenty-seventh embodiment which is the method of any of the first to twenty-sixth embodiments, wherein the ethylene that is contacted in the oligomerization process is received in a stream comprising ethylene and ethane.

A twenty-eighth embodiment which is the method of any of the first to twenty-seventh embodiments, wherein a sulfur removal system is not used between the oligomerization process and the aromatization process.

A twenty-ninth embodiment which is a system comprising: an oligomerization reactor configured to contact ethylene with a selective-higher-olefin catalyst to yield an oligomerization reactor effluent comprising $C_6$ hydrocarbons which include 1-hexene and $C_8$ hydrocarbons which include 1-octene; a first separation unit configured to recover 1-hexene and 1-octene from the oligomerization reactor effluent; a hydrogenation reactor configured to contact 1-hexene, 1-octene, or both 1-hexene and 1-octene recovered from the oligomerization reactor effluent with a hydrogenation catalyst to yield an aromatization feed comprising hexane, octane, or both; and an aromatization reactor configured to contact the aromatization feed with an aromatization catalyst to yield a reformate effluent comprising benzene, wherein the aromatization catalyst comprises a zeolite support, a group VIII metal, and one or more halides.

A thirtieth embodiment which is the system of the twenty-ninth embodiment, further comprising: a steam cracker configured to yield a cracker effluent comprising ethylene, wherein ethylene is recovered from the cracker effluent for oligomerization in the oligomerization reactor.

A thirty-first embodiment which is the system of the thirtieth embodiment, wherein the cracker effluent further comprises light hydrocarbons, wherein the oligomerization reactor, the first separation unit, a second separation unit configured to receive and separate the reformate effluent, or a combination thereof is configured to use the light hydrocarbons as a cooling source.

A thirty-second embodiment which is the system of the thirtieth embodiment, wherein the steam cracker is further configured to produce a steam effluent, wherein the oligomerization reactor, the first separation unit, a second separation unit configured to receive and separate the reformate effluent, or a combination thereof is configured to use the steam effluent as a heat source.

A thirty-third embodiment which is the system of any of the twenty-ninth to thirty-second embodiments, further comprising: a fractionator configured to fractionate a refinery stream to recover a naphtha stream, wherein, in the hydrogenation reactor, naphtha contacts the hydrogenation catalyst to yield one or more of n-hexane and n-octane in the aromatization feed.

A thirty-fourth embodiment which is the system of any of the twenty-ninth to thirty-second embodiments, wherein the reformate effluent further comprises toluene, ethylbenzene, xylene, 1-hexene, 1-octene, or a combination thereof, the system further comprising: a second separation unit configured to fractionate the reformate effluent into a benzene stream, a toluene stream, a xylene stream comprising ethylbenzene and xylene, and a raffinate stream.

A thirty-fifth embodiment which is the system of the thirty-fourth embodiment, wherein 1-hexene is present in the benzene stream, the toluene stream, or both the benzene stream and the toluene stream.

A thirty-sixth embodiment which is the system of the thirty-fourth embodiment, wherein 1-octene is present in the xylene stream, the raffinate stream, or both the xylene stream and the raffinate stream.

A thirty-seventh embodiment which is the system of the thirty-fourth embodiment, wherein the aromatization reactor is further configured to yield a hydrogen effluent, wherein the hydrogenation reactor is configured to receive a portion of the benzene stream and a portion of the hydrogen effluent and to yield cyclohexane therefrom, and wherein the oligomerization reactor is configured to receive the cyclohexane.

A thirty-eighth embodiment which is the system of any of the twenty-ninth to thirty-seventh embodiments, further comprising: a second separation unit configured to fractionate the oligomerization reactor effluent into a first stream comprising heavy hydrocarbons and spent catalyst, a second stream comprising octenes, and a third stream comprising hexenes, wherein, of the first stream, the second stream, and the third stream, only a portion of the third stream is fed to the aromatization reactor.

A thirty-ninth embodiment which is the system of any of the twenty-ninth to thirty-eighth embodiments, further comprising: a second separation unit configured to fractionate the oligomerization reactor effluent into a first stream comprising heavy hydrocarbons and spent catalyst, a second stream comprising octenes, and a third stream comprising hexenes, wherein, of the first stream, the second stream, and the third stream, only a portion of the second stream is fed to the aromatization reactor.

A fortieth embodiment which is the system of any of the twenty-ninth to thirty-eighth embodiments, further comprising: a second separation unit configured to fractionate the oligomerization reactor effluent into a first stream comprising heavy hydrocarbons and spent catalyst, a second stream comprising octenes, and a third stream comprising hexenes, wherein, of the first stream, the second stream, and the third stream, only a portion of the second stream and at least a portion of the third stream are fed to the aromatization reactor.

A forth-first embodiment which is the system of any of the twenty-ninth to thirty-eighth embodiments, further comprising: a second separation unit configured to fractionate the oligomerization reactor effluent into a first stream comprising heavy hydrocarbons and spent catalyst and a second stream comprising hexenes and octenes, wherein, of the first stream and the second stream, only a portion of the second stream is fed to the aromatization reactor.

A forty-second embodiment which is the system of any of the twenty-ninth to thirty-eighth embodiments, further comprising: a second separation unit configured to fractionate the oligomerization reactor effluent into a first stream comprising spent catalyst and a second stream comprising hexenes, octenes, and heavy hydrocarbons, wherein, of the first stream and the second stream, only a portion of the second stream is fed to the aromatization reactor.

A forty-third embodiment which is the system of any of the twenty-ninth to forty-second embodiments, wherein the first separation unit is configured to recover a first stream comprising heavy hydrocarbons and spent catalyst, a second stream comprising octenes, and a third stream comprising hexenes and hexanes, the system further comprising: a $C_6$ separator configured to split the third stream into a high purity 1-hexene stream and a hexanes stream; and cyclohexane recovery column configured separation the hexanes stream into a residual $C_6$ feed and a cyclohexane recycle, wherein the residual $C_6$ feed is fed to the aromatization reactor and wherein the cyclohexane recycle is fed to the oligomerization reactor.

A forty-fourth embodiment which is the system of any of the twenty-ninth to forty-third embodiments, wherein the selective-higher-olefin catalyst is selected from PN Mes-tBuPh-DIP, PN Mes-MeOPh-DIP, PN Xyl-Bz-DnB, PN Xyl-Bz-DPh, PN Guan-DIP, PN Mes-Ph-DIP, PN Xyl-Ph-DEt, PNP DPh-Hex-DPh, PNP DPh-Cy-DPh, PNP DPh-iPR-DPh2-OMe, PNP DPh-1MeiPR-DPh, or a combination thereof, and wherein the aromatization catalyst comprises a zeolite support, a group VIII metal, and one or more halides.

What is claimed is:

1. A method comprising:
    contacting, in an oligomerization process, ethylene with a selective-higher-olefin catalyst to yield an oligomerization reactor effluent comprising $C_6$ hydrocarbons which include 1-hexene and $C_8$ hydrocarbons which include 1-octene;
    recovering 1-hexene and 1-octene from the oligomerization reactor effluent;
    contacting, in a hydrotreating process, 1-hexene, 1-octene, or both 1-hexene and 1-octene recovered from the oligomerization reactor effluent with a hydrogenation catalyst to yield an aromatization feed comprising hexane, octane, or both; and
    contacting, in an aromatization process, the aromatization feed with an aromatization catalyst to yield an aromatization effluent comprising benzene.

2. The method of claim 1, wherein the $C_6$ hydrocarbons are present in an amount of about 20 wt. % to about 99 wt. % based on a total weight of the oligomerization reactor effluent, and the $C_8$ hydrocarbons are present in an amount of about 0.1 wt. % to about 75 wt. % based on a total weight of the oligomerization reactor effluent.

3. The method of claim 1, wherein recovering 1-hexene and 1-octene from the oligomerization reactor effluent comprises:
fractionating the oligomerization reactor effluent into a first stream comprising heavy hydrocarbons comprising $C_{9+}$ hydrocarbons and spent catalyst, a second stream comprising octenes, and a third stream comprising hexenes,
wherein, of the first stream, the second stream, and the third stream, only a portion of the third stream is fed to the hydrotreating process.

4. The method of claim 1, wherein recovering 1-hexene and 1-octene from the oligomerization reactor effluent comprises:
fractionating the oligomerization reactor effluent into a first stream comprising heavy hydrocarbons comprising $C_{9+}$ hydrocarbons and spent catalyst, a second stream comprising octenes, and a third stream comprising hexenes,
wherein, of the first stream, the second stream, and the third stream, only a portion of the second stream and only a portion of the third stream are fed to the hydrotreating process.

5. The method of claim 1, wherein recovering 1-hexene and 1-octene from the oligomerization reactor effluent comprises:
fractionating the oligomerization reactor effluent into a first stream comprising heavy hydrocarbons comprising $C_{9+}$ hydrocarbons and spent catalyst and a second stream comprising hexenes and octenes,
wherein, of the first stream and the second stream, only a portion of the second stream is fed to the hydrotreating process.

6. The method of claim 1, wherein recovering 1-hexene and 1-octene from the oligomerization reactor effluent comprises:
fractionating the oligomerization reactor effluent into a first stream comprising spent catalyst and a second stream comprising hexenes, octenes, and heavy hydrocarbons comprising $C_{9+}$ hydrocarbons,
wherein, of the first stream and the second stream, only a portion of the second stream is fed to the hydrotreating process.

7. The method of claim 1, wherein recovering 1-hexene and 1-octene from the oligomerization reactor effluent comprises:
separating the oligomerization reactor effluent into a first stream comprising heavy hydrocarbons comprising $C_{9+}$ hydrocarbons and spent catalyst, a second stream comprising octenes, and a third stream comprising hexenes;
fractionating the third stream to yield a 1-hexene stream and a $C_6$ feed stream; and
flowing the $C_6$ feed stream to the hydrotreating process.

8. The method of claim 1, further comprising:
fractionating a refinery stream to recover a naphtha stream;
feeding the naphtha stream to the hydrotreating process; and
contacting, in the hydrotreating process, naphtha with the hydrogenation catalyst to yield one or more of n-hexane and n-octane in the aromatization feed.

9. The method of claim 1, wherein the aromatization effluent further comprises toluene, ethylbenzene, xylene, 1-hexene, 1-octene, or a combination thereof, the method further comprising:
fractionating the aromatization effluent into a benzene stream, a toluene stream, a xylene stream, and a raffinate stream.

10. The method of claim 9, wherein the aromatization process is further configured to produce a hydrogen effluent, the method further comprising:
flowing a portion of the benzene stream and a portion of the hydrogen effluent to a hydrogenation process to yield cyclohexane; and
feeding the cyclohexane to the oligomerization process.

11. The method of claim 1, wherein the oligomerization reactor effluent further comprises cyclohexane and other hexanes, the method further comprising:
recovering cyclohexane and the other hexanes from the oligomerization reactor effluent;
flowing the other hexanes recovered from the oligomerization reactor effluent to the hydrotreating process; and
recycling cyclohexane recovered from the oligomerization reactor effluent to the oligomerization process.

12. The method of claim 1, further comprising:
cracking ethane, propane, butane, pentane, naphtha, or mixtures thereof in a steam cracker to yield a cracker effluent comprising ethylene; and
flowing ethylene recovered from the cracker effluent to the oligomerization process.

13. The method of claim 12, wherein the cracker effluent further comprises light hydrocarbons, the method further comprising:
using light hydrocarbons recovered from the cracker effluent as a cooling source for an oligomerization reactor in the oligomerization process, for a first fractionation process located downstream of the oligomerization process, for a second fractionation process located downstream of the aromatization process, or a combination thereof.

14. The method of claim 12, further comprising:
recovering steam from the steam cracker; and
using steam as a heating source for the oligomerization process, for a first fractionation process located downstream of the oligomerization process, for a second fractionation process located downstream of the aromatization process, or a combination thereof.

15. The method of claim 12, further comprising:
flowing a raffinate recovered from the aromatization process to the steam cracker; and
cracking the raffinate in the steam cracker.

16. The method of claim 1, wherein the step of contacting ethylene and a selective-higher-olefin catalyst is performed in the presence of a diluent recovered from the aromatization effluent, wherein the diluent is a raffinate, benzene, toluene, xylene, branched alkanes, or combinations thereof.

17. The method of claim 1, further comprising:
flowing a raffinate recovered from the aromatization process to a steam cracker; and
cracking the raffinate in the steam cracker.

18. The method of claim 1, wherein the oligomerization reactor effluent further comprises $C_{9+}$ hydrocarbons, the method further comprising:
blending the $C_{9+}$ hydrocarbons, a raffinate stream obtained from the aromatization effluent, or both the $C_{9+}$ hydrocarbons and the raffinate stream into a motor fuel stream.

19. The method of claim 1, further comprising:
flowing hydrogen obtained from the aromatization effluent to the oligomerization process, the hydrotreating process, or both the oligomerization process and the hydrotreating process.

20. A method comprising: contacting, in an oligomerization process, ethylene with a selective-higher-olefin catalyst to yield an oligomerization reactor effluent comprising $C_6$ hydrocarbons which include 1-hexene and $C_8$ hydrocarbons which include 1-octene;
contacting, in a hydrotreating process, a hydrogenation catalyst with 1-hexene, 1-octene, or both 1-hexene and 1-octene recovered from the oligomerization reactor effluent to yield an aromatization feed comprising hexane, octane, or both; and
contacting, in an aromatization process comprising a plurality of aromatization reactors and at least one furnace, the aromatization feed with an aromatization catalyst to yield an aromatization effluent comprising benzene.

21. The method of claim 20, further comprising:
fractionating a refinery stream to recover a naphtha stream;
feeding the naphtha stream to the hydrotreating process; and
contacting, in the hydrotreating process, naphtha with the hydrogenation catalyst to yield one or more of n-hexane and n-octane in the aromatization feed.

22. The method of claim 21, wherein the aromatization effluent further comprises toluene, ethylbenzene, xylene, 1-hexene, 1-octene, or a combination thereof, the method further comprising:
fractionating the aromatization effluent into a benzene stream, a toluene stream, a xylene stream, and a raffinate stream.

23. The method of claim 22, wherein the aromatization process is further configured to produce a hydrogen effluent, the method further comprising:
flowing a portion of the benzene stream and a portion of the hydrogen effluent to a hydrogenation process to yield cyclohexane; and
feeding the cyclohexane to the oligomerization reactor.

24. The method of claim 23, further comprising:
flowing a portion of the hydrogen effluent to the oligomerization process, the hydrotreating process, or both the oligomerization process and the hydrotreating process.

25. The method of claim 21, further comprising:
flowing a raffinate recovered from the aromatization process to a steam cracker; and
cracking the raffinate in the steam cracker to produce a cracker effluent.

26. The method of claim 25, wherein the cracker effluent comprises ethylene and further comprising flowing the ethylene to the oligomerization reactor.

27. The method of claim 26, wherein the oligomerization reactor effluent further comprises $C_{9+}$ hydrocarbons, the method further comprising:
blending the $C_{9+}$ hydrocarbons, a raffinate stream obtained from the reformate aromatization effluent, or both the $C_{9+}$ hydrocarbons and the raffinate stream into a motor fuel stream.

* * * * *